United States Patent
Yashiro et al.

(10) Patent No.: US 10,037,109 B2
(45) Date of Patent: Jul. 31, 2018

(54) TOUCH-PANEL SUBSTRATE AND ELECTRONIC DEVICE WITH ELECTRODES PROVIDED ON DIFFERENT PLANE SURFACES AND REDUCED NON-UNIFORMITY OF IN-PLANE LIGHT TRANSMITTANCE

(71) Applicant: Sharp Kabushiki Kaisha, Osaka-shi, Osaka (JP)

(72) Inventors: Yuhji Yashiro, Osaka (JP); Kazutoshi Kida, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 266 days.

(21) Appl. No.: 14/648,945

(22) PCT Filed: Dec. 24, 2013

(86) PCT No.: PCT/JP2013/084513
§ 371 (c)(1),
(2) Date: Jun. 2, 2015

(87) PCT Pub. No.: WO2014/104029
PCT Pub. Date: Jul. 3, 2014

(65) Prior Publication Data
US 2016/0018925 A1    Jan. 21, 2016

(30) Foreign Application Priority Data

Dec. 28, 2012  (JP) ................................ 2012-288922

(51) Int. Cl.
*G06F 3/044* (2006.01)
(52) U.S. Cl.
CPC .... *G06F 3/044* (2013.01); *G06F 2203/04112* (2013.01)

(58) Field of Classification Search
CPC ................ G06F 2203/04112; G06F 3/044
USPC ........................................ 345/156, 173–178
See application file for complete search history.

(56) References Cited

U.S. PATENT DOCUMENTS

| 2009/0002337 A1* | 1/2009 | Chang .................... G06F 3/044 345/174 |
| 2010/0045614 A1* | 2/2010 | Gray ...................... G06F 3/044 345/173 |
| 2012/0118614 A1 | 5/2012 | Kuriki |
| 2012/0212449 A1 | 8/2012 | Kuriki |

FOREIGN PATENT DOCUMENTS

| CN | 101887324 A | 11/2010 |
| JP | 2012-014669 A | 1/2012 |
| JP | 2012-108845 A | 6/2012 |

* cited by examiner

*Primary Examiner* — Ram A Mistry
(74) *Attorney, Agent, or Firm* — Keating & Bennett, LLP

(57) ABSTRACT

Provided are (i) a touch panel substrate improved in uniformity of in-plane light transmittance and (ii) an electronic device employing the touch panel substrate. First sensor electrodes (11) are arranged in a first electrode layer (10), and second electrodes are arranged in a second electrode layer. In part of an outer edge of a first sensor electrode (11) which part is arranged side by side with an outer edge of a second electrode when viewed from above, ends of conductor lines (13) of the first sensor electrode (11) have respective wide width parts (40) each of which is wider than the other part of the conductor lines (13) when viewed from above.

9 Claims, 28 Drawing Sheets

F I G. 1
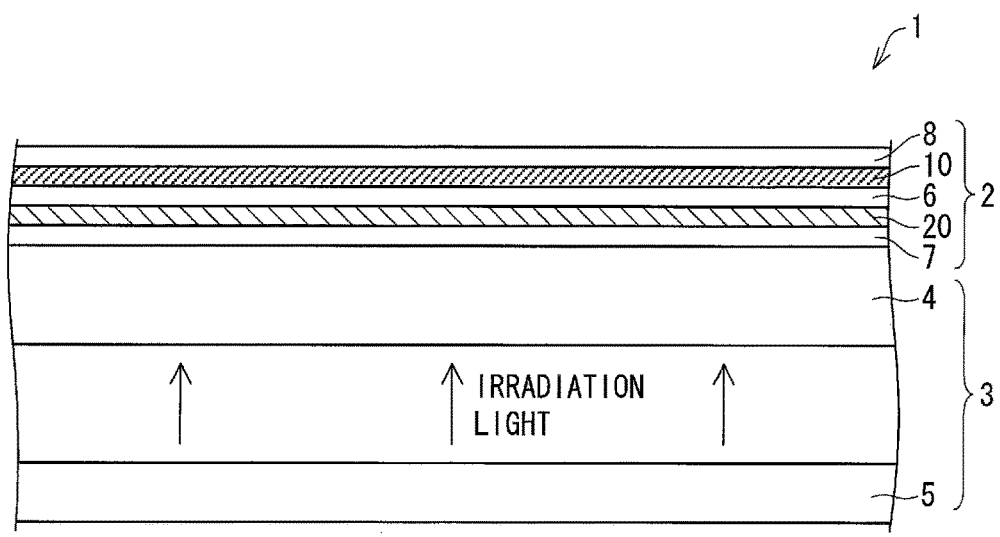

FIG. 2
11 
11 
11 
11 
11 
11 

F I G. 1 6
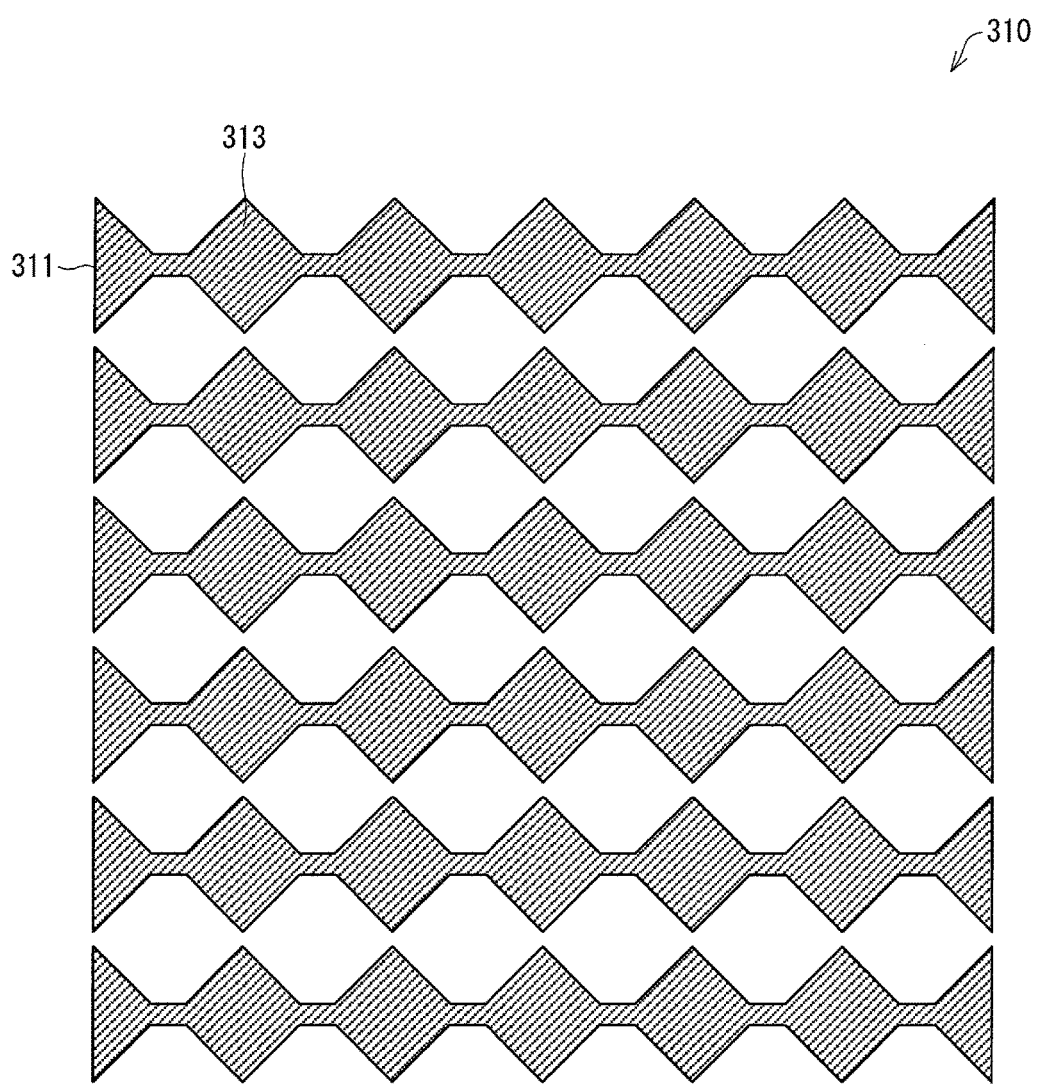

F I G. 1 8
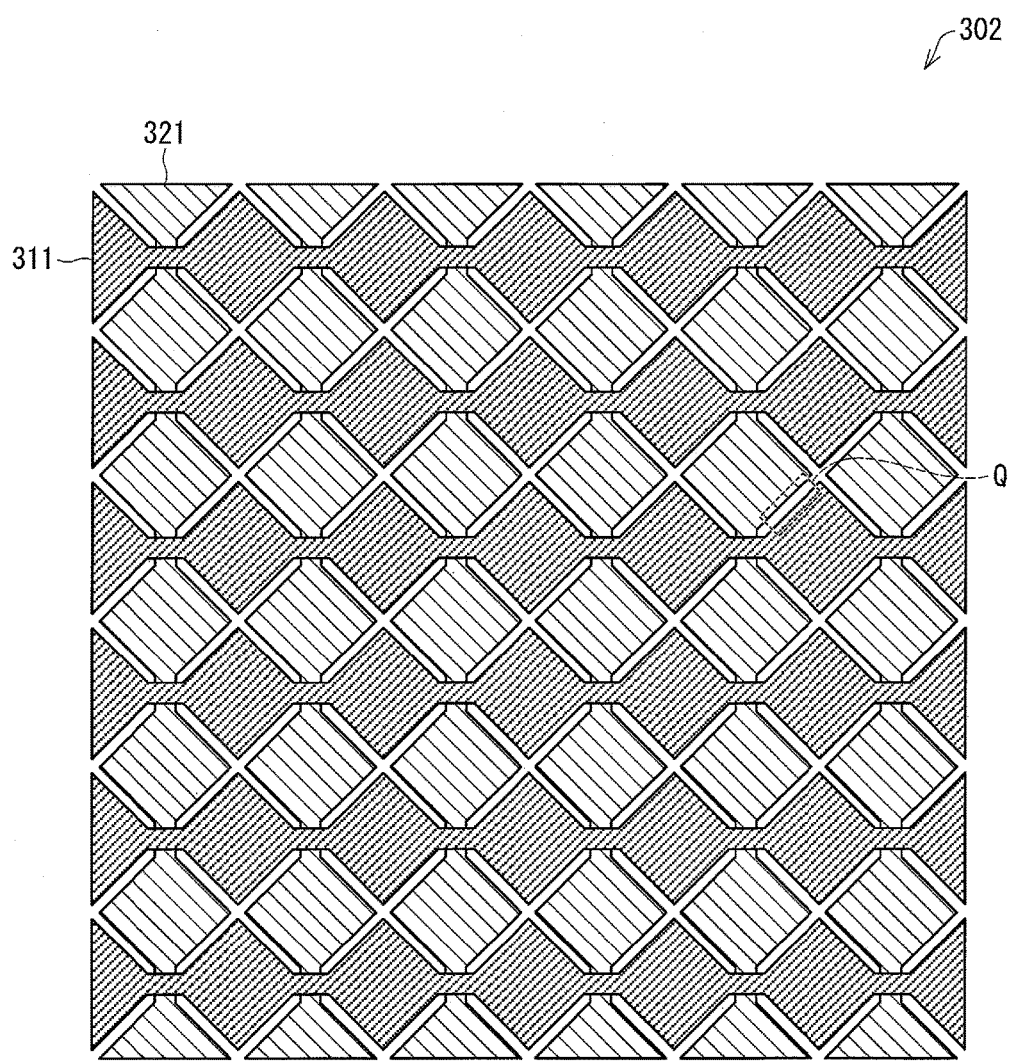

F I G. 2 0
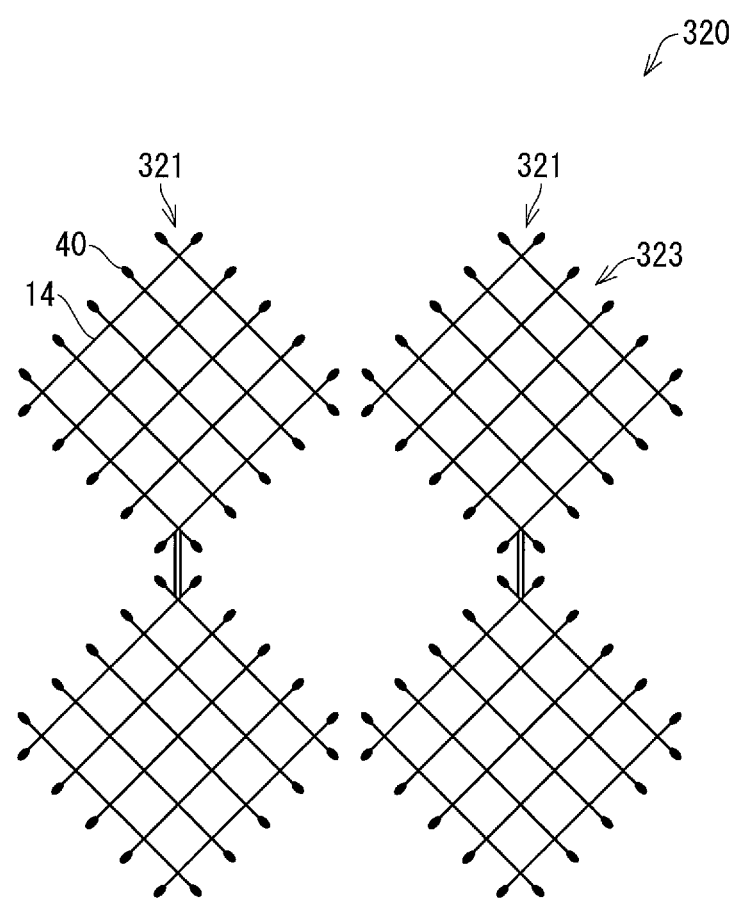

FIG. 28
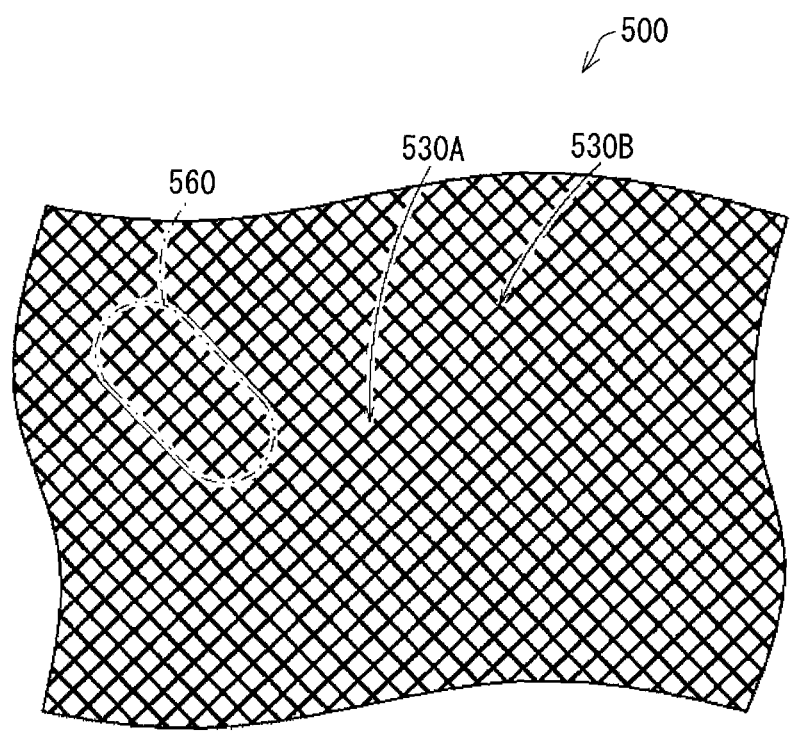
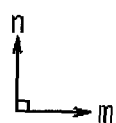

TOUCH-PANEL SUBSTRATE AND ELECTRONIC DEVICE WITH ELECTRODES PROVIDED ON DIFFERENT PLANE SURFACES AND REDUCED NON-UNIFORMITY OF IN-PLANE LIGHT TRANSMITTANCE

TECHNICAL FIELD

The present invention relates to a touch panel substrate and an electronic device.

BACKGROUND ART

A touch panel has a plurality of electrodes which are electrically insulated from each other. The touch panel is capable of detecting a contact position, where a detection target is in contact with a detection surface, by detecting a change in capacitance in an electrode which change is produced in a case where a finger or an input pen is brought into contact with a detection surface. Such electronic devices are widely used that a touch panel is provided on a display surface of a display device and that allows a user to input an operation via a display screen while the user is looking at a displayed image.

Further, there is known a touch panel which has two electrode layers provided on respective different plane surfaces and which detects a contact position of a detection target in accordance with a change in capacitance between an electrode provided in one of the two electrode layers and an electrode provided in the other of the two electrode layers.

In regard to such a technique, Patent Literature 1 discloses a touch panel having a conductive film for a touch panel which film is capable of suppressing occurrence of a moire even in a case where the conductive film is attached to a display panel of a display device. Patent Literature 2 discloses a conductive sheet suitable for use in a projected capacitive touch panel.

FIGS. 25 through 28 are views each for explaining a touch panel of Patent Literature 1. FIG. 25 is a cross-sectional view illustrating a layered conductive film. FIG. 26 is a plan view illustrating first conductive patterns formed in a first conductive film. FIG. 27 is a plan view illustrating second conductive patterns formed in a second conductive film. FIG. 28 is a plan view illustrating the layered conductive film in which the first conductive film and the second conductive film are combined.

The touch panel of Patent Literature 1 includes a layered conductive film 500. As illustrated in FIG. 25, the layered conductive film 500 is configured such that a first conductive film 510A is layered on a second conductive film 510B. The first conductive film 510A has a first transparent substrate 512A and a first conductive part 514A formed on a principal surface of the first transparent substrate 512A. The second conductive film 510B has a second transparent substrate 512B and a second conductive part 514B formed on a principal surface of the second transparent substrate 512B.

As illustrated in FIG. 26, the first conductive part 514A extends in an "m" direction in FIG. 26. The first conductive part 514A has (i) first conductive patterns 520A each made up of a thin metal line 516 and (ii) first auxiliary patterns 540A arranged around the first conductive patterns 520A.

Each of the first conductive patterns 520A is configured such that two or more first large grids 530A are connected to each other. Each of the first large grids 530A is configured such that two or more small grids 550 are combined.

As illustrated in FIG. 27, the second conductive part 514B extends in an "n" direction in FIG. 27. The second conductive part 514B has (i) second conductive patterns 520B each made up of a thin metal line 516 and (ii) second auxiliary patterns 540B arranged around the second conductive patterns 520B.

Each of the second conductive patterns 520B is configured such that two or more second large grids 530B are connected to each other. Each of the second large grids 530B is configured such that two or more small grids 550 are combined.

In a case where the first conductive film 510A is layered on the second conductive film 510B so as to form the layered conductive film 500, the first conductive patterns 520A and the second conductive patterns 520B are arranged so as to intersect each other, and the second large grids 530B of the second conductive film 510B are arranged so as to fill in gaps between the first large grids 530A of the first conductive film 510A.

In this case, when viewed from above, combination patterns 560 are formed by the first auxiliary patterns 540A facing the second auxiliary patterns 540B. As a result, when the layered conductive film 500 is viewed from above, the small grids 550 are laid all over as illustrated in FIG. 28. This causes boundaries, between the first large grids 530A and the second large grids 530B, not to be visible. Accordingly, visibility is improved.

CITATION LIST

Patent Literature 1

Japanese Patent Application Publication, Tokukai, No. 2012-108845 A (Publication Date: Jun. 7, 2012)

Patent Literature 2

Japanese Patent Application Publication, Tokukai, No. 2012-14669 A (Publication Date: Jan. 19, 2012)

SUMMARY OF INVENTION

Technical Problem

However, according to the touch panel of Patent Literature 1, in a case where the first conductive film 510A is layered on the second conductive film 510B so as to form the layered conductive film 500, the combination patterns 560 may not be normally formed by the first auxiliary patterns 540A and the second auxiliary patterns 540B, depending on a relative positional relationship between the first conductive film 510A and the second conductive film 510B, and, accordingly, uniform patterns as illustrated in FIG. 28 may not formed.

That is, due to misalignment between the first conductive film 510A and the second conductive film 510B, thin metal lines 516 are not arranged uniformly when viewed from above. This causes the layered conductive film 500 to have ununiform light transmittance. Specifically, the boundaries between the first large grids 530A and the second large grids 530B are higher in light transmittance than the other part.

In a case where such a touch panel is combined with a display device, brightness at the boundaries between the first large grids 530A and the second large grids 530B becomes high, so that visual problems arises such that a pattern is visually recognized, by a viewer of an image displayed by the display device, along the boundaries between the first large grids 530A and the second large grids 530B.

The present invention has been made in view of the above problems, and an object of the present invention is to provide (i) a touch panel substrate which includes electrodes provided on different plane surfaces and which is improved in uniformity of in-plane light transmittance and (ii) an electronic device employing the touch panel substrate.

Solution to Problem

In order to attain the above object, a touch panel substrate in accordance with an aspect of the present invention is a touch panel substrate including: a first electrode layer; an insulating layer; and a second electrode layer provided so as to face the first electrode layer via the insulating layer, the first electrode layer including a plurality of first electrodes each of which is constituted by first conductor lines arranged in a net-like pattern, the second electrode layer including a plurality of second electrodes each of which is constituted by second conductor lines arranged in a net-like pattern, in part of an outer edge of each of the plurality of first electrodes which part is arranged side by side with an outer edge of at least one of the plurality of second electrodes when viewed from above, an end of at least one of the first conductor lines has a wide width part which is wider than the other part of the at least one of the first conductor lines when viewed from above.

Advantageous Effects of Invention

According to an aspect of the present invention, it is possible to provide (i) a touch panel substrate which includes electrodes provided on different plane surfaces and which is improved in uniformity of in-plane light transmittance and (ii) an electronic device employing the touch panel substrate.

BRIEF DESCRIPTION OF DRAWINGS

FIG. 1 is a cross-sectional view illustrating an electronic device of Embodiment 1 of the present invention.

FIG. 2 is a plan view illustrating a configuration of a first electrode layer of a touch panel substrate of Embodiment 1.

FIG. 16 is a plan view illustrating a configuration of a first electrode layer of a touch panel substrate of Embodiment 4.

FIG. 18 is a plan view illustrating a configuration of the touch panel substrate of Embodiment 4 which configuration is observed when the first electrode layer is superimposed over the second electrode layer.

FIG. 20 is a plan view illustrating, in detail, the configuration of the second electrode layer of the touch panel substrate of Embodiment 4.

FIG. 28 is a plan view illustrating the layered conductive film, of the touch panel of Patent Literature 1 serving as a conventional technique, in which the first conductive film and the second conductive film are combined.

DESCRIPTION OF EMBODIMENTS

Embodiment 1

Figure 3:
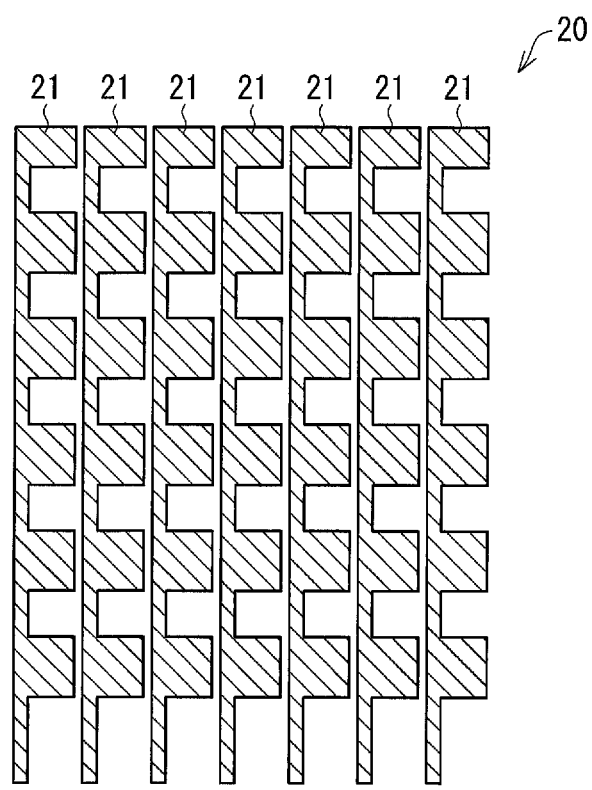
FIG. 3 is a plan view illustrating a configuration of a second electrode layer of the touch panel substrate of Embodiment 1.

The following description will discuss Embodiment 1 of the present invention with reference to FIGS. 1 through 11.

FIG. 1 is a cross-sectional view illustrating an electronic device 1 of Embodiment 1. As illustrated in FIG. 1, the electronic device 1 includes a touch panel substrate 2 and a display device 3.

As the display device 3, various display devices, such as a liquid crystal display device and an organic EL display device, can be employed. The display device 3 includes a display panel 4 and a backlight 5 which is provided on a back surface side of the display panel 4 (on a side opposite to a display surface) and which irradiates the display panel 4 with light. The display device 3 further includes various driving circuits (not illustrated) for controlling an image to be displayed on the display surface of the display panel 4.

As the display panel 4, for example, an active matrix type liquid crystal display panel can be employed in which a liquid crystal layer is sandwiched between an active matrix substrate and a color filter substrate.

<Touch Panel Substrate>

The touch panel substrate 2 is a capacitance type touch panel substrate provided on a display surface side of the display panel 4 (on a user side). The touch panel substrate 2 includes a substrate 6, a first electrode layer 10, a second electrode layer 20, a first protection layer 8, and a second protection layer 7. The first electrode layer 10 is provided on a surface of the substrate 6 which surface is located on a front surface side. The second electrode layer 20 is provided on a surface of the substrate 6 which surface is located on the back surface side. That is, the first electrode layer 10 and the second electrode layer 20 are provided so as to face each other via the substrate 6.

The substrate 6 can be made of an insulator such as glass or a plastic film. The substrate 6 functions as an insulating layer which electrically insulates the first electrode layer 10 from the second electrode layer 20.

The first protection layer 8 is provided on the front surface side of the first electrode layer 10. The second protection layer 7 is provided on the back surface side of the second electrode layer 20.

The first protection layer 8 has a surface with which a detection target is in contact, and can be made of a light transmissive insulator such as glass or a plastic film. Similarly, the second protection layer 7 can be made of a light transmissive insulator such as glass or a plastic film. For example, the second protection layer 7 can be adhered to the display panel 4.

<Electrode Layer>

Configurations of the first electrode layer 10 and the second electrode layer 20 of the touch panel substrate 2 of Embodiment 1 will be described below in detail. The touch panel substrate 2 has such a structure that the first electrode layer 10 is superimposed over the second electrode layer 20 when viewed from above.

FIG. 2 is a plan view illustrating a configuration of the first electrode layer 10 of the touch panel substrate 2 of Embodiment 1. FIG. 3 is a plan view illustrating a configuration of the second electrode layer 20 of the touch panel substrate of Embodiment 1.

As illustrating in FIG. 2, the first electrode layer 10 has a plurality of electrodes for a first sensor (hereinafter, referred to as first sensor electrodes 11) which electrodes extend in a lateral direction in FIG. 2. Each of the first sensor electrodes 11 has a strip shape (rectangular shape). The first sensor electrodes 11 are arranged at predetermined intervals.

As illustrated in FIG. 3, the second electrode layer 20 has a plurality of electrodes for a second sensor (hereinafter, referred to as second sensor electrodes 21) which electrodes extend in a longitudinal direction in FIG. 3. The second sensor electrodes 21 are arranged at predetermined intervals. An outer edge of each of the second sensor electrodes 21 has such a shape that a rectangle serving as an axis has a plurality of rectangles each serving as a branch. In other words, the outer edge of each of the second sensor electrodes 21 has such a shape that a strip has, on its long side, recesses each having a rectangular shape.

An interval between adjacent ones of the recesses of each of the second sensor electrodes 21 is identical to that between adjacent ones of the first sensor electrodes 11.

Figure 4:
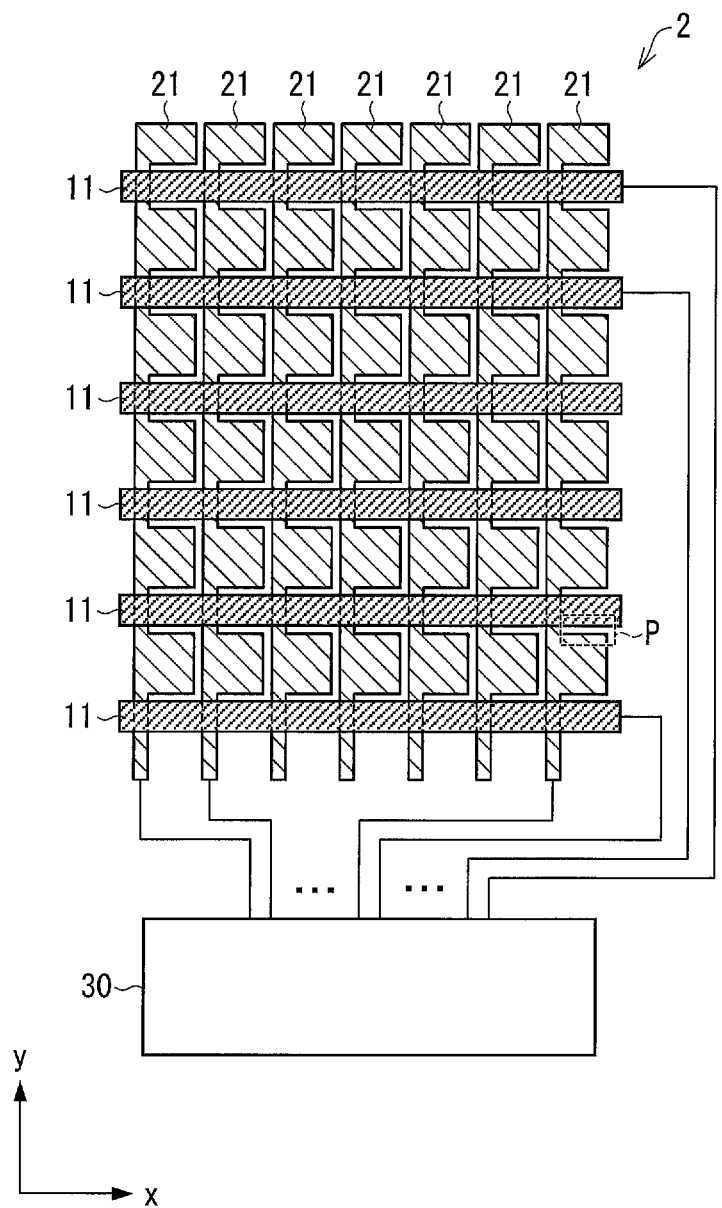
FIG. 4 is a plan view illustrating a configuration of the touch panel substrate of Embodiment 1 which configuration is observed when the first electrode layer is superimposed over the second electrode layer.

FIG. 4 is a plan view illustrating a configuration of the touch panel substrate 2 of Embodiment 1 which configuration is observed when the first electrode layer 10 is superimposed over the second electrode layer 20.

As illustrated in FIG. 4, the touch panel substrate 2 has such a structure that the first electrode layer 10 is superimposed over the second electrode layer 20 via the substrate 6 so that (i) the first sensor electrodes 11, which extends in an X direction in FIG. 4, intersect the second sensor electrodes 21, which extends in a Y direction in FIG. 4, when viewed from above and (ii) the first sensor electrodes 11 overlaps the recesses of the second sensor electrodes 21.

In this case, the outer edge of each of the first sensor electrodes 11 is arranged, in part, side by side with the outer edge of each of the second sensor electrodes 21, when viewed from above (see a region P illustrated in FIG. 4 and enclosed by a broken line).

More specifically, when viewed from above, a side, parallel to the X direction in FIG. 4, of the outer edge of each of the first sensor electrodes 11 is arranged so as to be close to a side, parallel to the X direction in FIG. 4, of the outer edge of each of the second sensor electrodes 21.

Each of the first sensor electrodes 11 is connected to a position detecting circuit 30. Similarly, each of the second sensor electrodes 21 is connected to the position detecting circuit 30.

Capacitances are formed between the first sensor electrodes 11 and the second sensor electrodes 21. In a case where a detection target such as a human's finger is brought into contact with a surface of the touch panel substrate 2, a change occurs in value of a capacitance. By the position detecting circuit 30 detecting the change in value of the capacitance, it is possible to specify a contact position where the detection target is in contact with the surface (the first protection layer 8) of the touch panel substrate 2.

For example, by (i) applying drive voltages to the first sensor electrodes 11 and (ii) measuring a change in voltages of the second sensor electrodes 21, a first sensor electrode 11

(row) and a second sensor electrode 21 (column) between which a value of a capacitance has changed is specified.

Note that a known circuit can be employed as the position detecting circuit 30 for detecting a position of coordinates of a detection target, and the position detecting circuit 30 is not limited any particular one.

Configurations of the first sensor electrodes 11 and the second sensor electrodes 21 of the touch panel substrate 2 of Embodiment 1 will be described below in detail.

<First Sensor Electrode>

Figure 5:
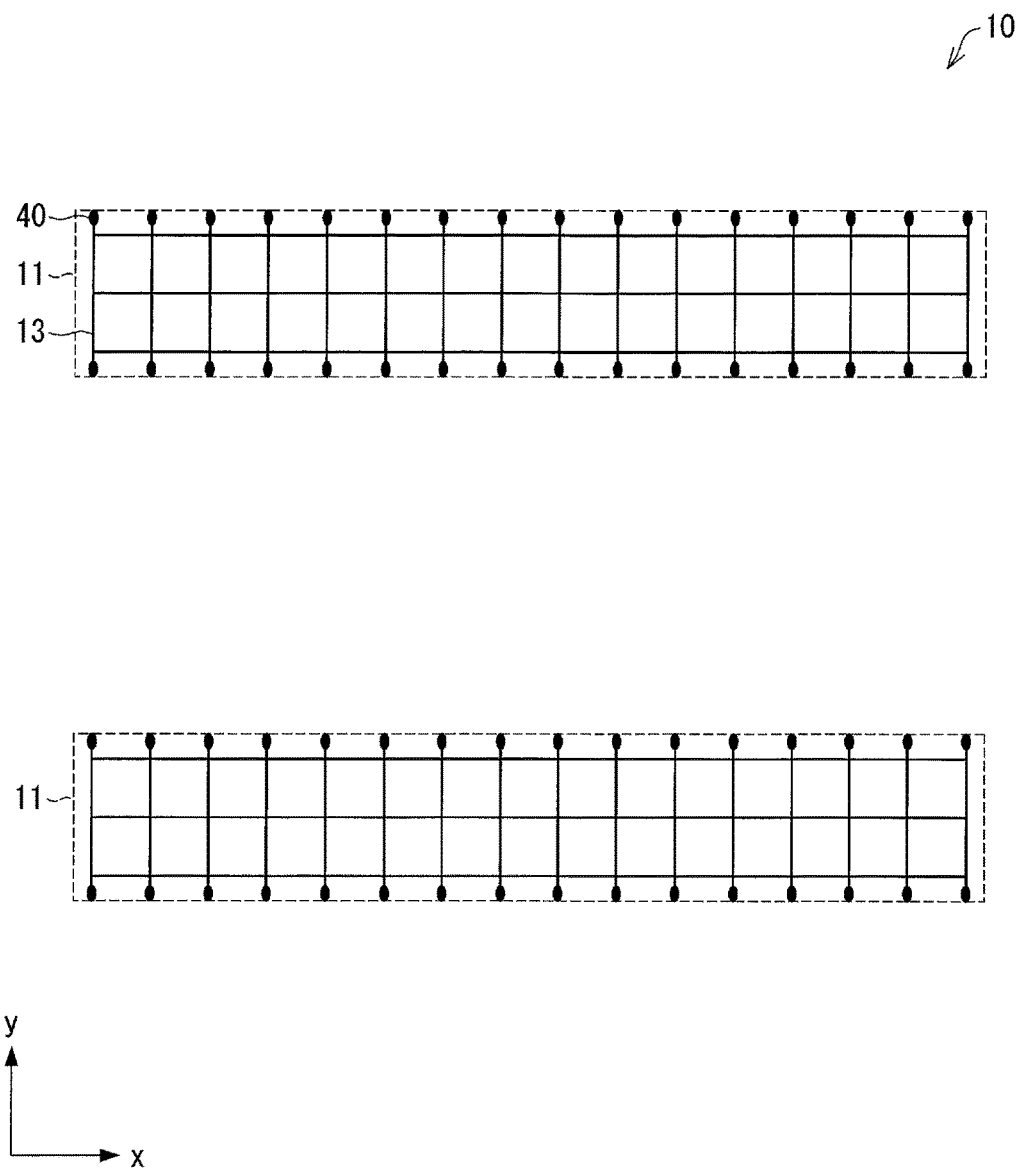
FIG. 5 is a plan view illustrating, in detail, the configuration of the first electrode layer of the touch panel substrate of Embodiment 1.

FIG. 5 is a plan view illustrating, in detail, the configuration of the first electrode layer 10 of Embodiment 1.

As illustrated in FIG. 5 with the use of broken lines, the first sensor electrodes 11, each including first conductor lines 13 arranged on an identical plane surface in a net-like pattern, are arranged in the first electrode layer 10. That is, the conductor lines 13 constitute each of the first sensor electrodes 11.

As described with reference to FIG. 4, a side, parallel to the X direction in FIG. 4, of an outer edge of a first sensor electrode 11 is arranged side by side with an outer edge of a second sensor electrode 21.

Further, as illustrated in FIG. 5 with the use of broken lines, a shape (side) of part of the outer edge of the first sensor electrode 11, which part is parallel to the X direction in FIG. 5, is defined by ends of the first conductor lines 13.

The ends of the first conductor lines 13 have respective wide width parts 40 each of which is wider than the other part of the first conductor lines 13. That is, assuming that a width of part, other than the wide width parts 40, of the first conductor lines 13 is represented by d1, a width d2 of each of the wide width parts 40 is greater than d1, when viewed from above.

Note that the wide width parts 40 are provided so as not to overlap intersections of the first conductor lines 13.

Each of the first conductor lines 13 is preferably made of a material, such as metal, which has lower electric resistance. Note that numberless first conductor lines 13 are actually formed in the first sensor electrode 11. However, in FIG. 5, such numberless first conductor lines 13 are simplified for convenience.

Note also that the first conductor lines 13 arranged in a net-like pattern are not necessary to have a square grid shape, and can be alternatively arranged so as to have a parallelogram grid shape.

<Second Sensor Electrode>

Figure 6:
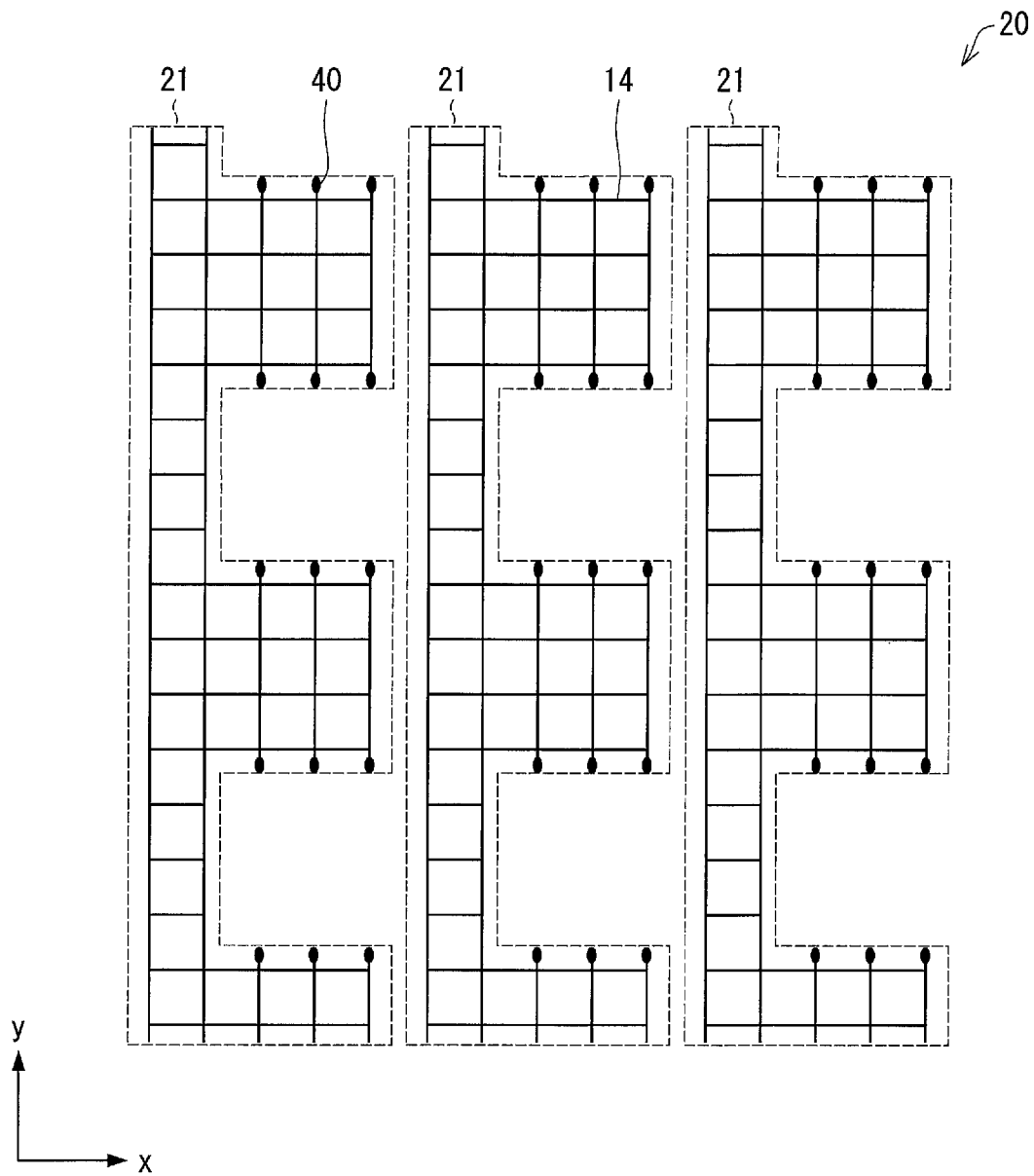
FIG. 6 is a plan view illustrating, in detail, the configuration of the second electrode layer of the touch panel substrate of Embodiment 1.

FIG. 6 is a plan view illustrating, in detail, the configuration of the second electrode layer 20 of Embodiment 1.

As illustrated in FIG. 6 with the use of broken lines, the second sensor electrodes 21, each including second conductor lines 14 arranged on an identical plane surface in a net-like pattern, are arranged in the second electrode layer 20. That is, the second conductor lines 14 constitute each of the second sensor electrodes 21.

As described with reference to FIG. 4, a side, parallel to the X direction in FIG. 4, of an outer edge of a second sensor electrode 21 is arranged side by side with an outer edge of a first sensor electrode 11.

Further, as illustrated in FIG. 6 with the use of broken lines, a shape (side) of part of the outer edge of the second sensor electrode 21, which part is parallel to the X direction in FIG. 6, is defined by ends of the second conductor lines 14.

The ends of the second conductor lines 14 have respective wide width parts 40 each of which is wider than the other part of the second conductor lines 14. That is, assuming that a width of part, other than the wide width parts 40, of the second conductor lines 14 is represented by d1, a width d2 of each of the wide width parts 40 is greater than d1, when viewed from above.

Note that the wide width parts 40 are provided so as not to overlap intersections of the second conductor lines 14.

Each of the second conductor lines 14 is preferably made of a material, such as metal, which has lower electric resistance. Note that numberless second conductor lines 14 are actually formed in the second sensor electrode 21. However, in FIG. 6, such numberless second conductor lines 14 are simplified for convenience.

Note also that the second conductor lines 14 arranged in a net-like pattern are not necessary to have a square grid shape, and can be alternatively arranged so as to have a parallelogram grid shape.

<Transmittance Uniformity>

Light transmittance of the touch panel substrate 2 of the present invention will be described below.

Figure 7:
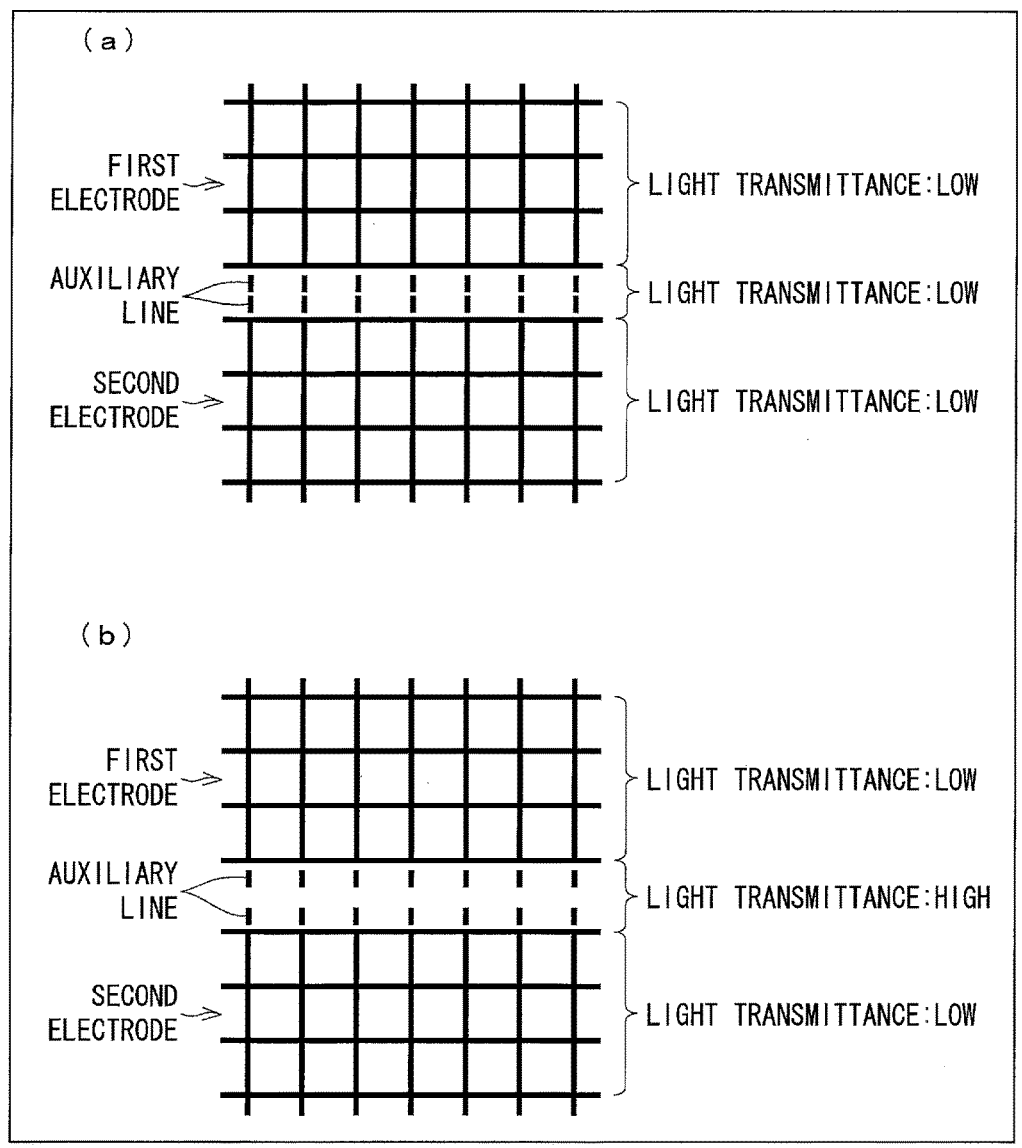
FIG. 7 is a view for explaining light transmittance of a conventional touch panel substrate. (a) of FIG. 7 is a plan view illustrating part of the conventional touch panel substrate in which two electrode layers are properly aligned. (b) of FIG. 7 is a plan view illustrating part of the conventional touch panel substrate in which the two electrode layers are not properly aligned.

FIG. 7 is a view for explaining light transmittance of a conventional touch panel substrate. (a) of FIG. 7 is a plan view illustrating part of the conventional touch panel substrate in which two electrode layers are properly aligned. (b) of FIG. 7 is a plan view illustrating part of the conventional touch panel substrate in which the two electrode layers are not properly aligned.

Figure 8:
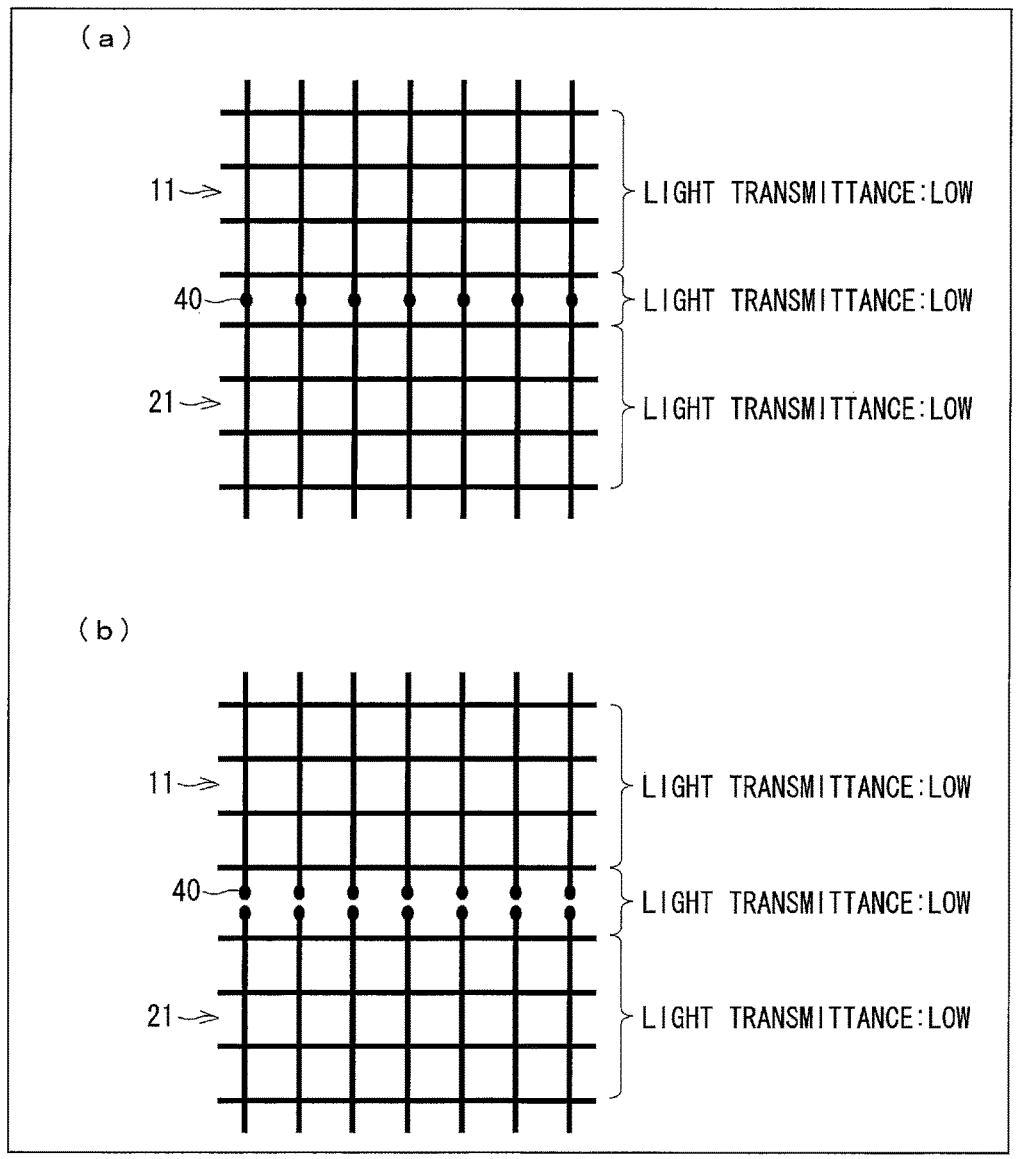
FIG. 8 is a view for explaining light transmittance of the touch panel substrate of Embodiment 1. (a) of FIG. 8 is a plan view illustrating part of the touch panel substrate in which the first electrode layer and the second electrode layer are properly aligned. (b) of FIG. 8 is a plan view illustrating part of the touch panel substrate in which the first electrode layer and the second electrode layer are not properly aligned.

FIG. 8 is a view for explaining light transmittance of the touch panel substrate 2 of Embodiment 1. (a) of FIG. 8 is a plan view illustrating part of the touch panel substrate 2 in which the first electrode layer 10 and the second electrode layer 20 are properly aligned. (b) of FIG. 8 is a plan view illustrating part of the touch panel substrate 2 in which the first electrode layer 10 and the second electrode layer 20 are not properly aligned.

(a) and (b) of FIG. 8 each correspond to an enlarged view of the region P illustrated in FIG. 4 and enclosed by the broken line.

An opaque conductor line is often used as a conductor line, employed for an electrode of a touch panel substrate, so that electric resistance is low. In this case, light that enters an electrode layer is blocked by the conductor line. Therefore, the light passes through part of the electrode layer in which part no conductor line is provided.

According to the conventional touch panel substrate as in Patent Literature 1, in a case where the two electrode layers are properly aligned and then adhered to each other via an insulating layer, conductor lines uniformly arranged in a net-like pattern are formed by (i) first electrodes and auxiliary lines included in one of the two electrode layers and (ii) second electrodes and auxiliary lines included in the other of the two electrode layers, when viewed from above (see (a) of FIG. 7). This causes the conventional touch panel substrate to have uniform in-plane light transmittance.

However, during a process of manufacturing a touch panel substrate, there is a case where, while electrode layers are being adhered to each other, a relative positional relationship between the electrode layers varies depending on the touch panel substrate. Specifically, when viewed from above, a first sensor electrode 11 is apart from a second sensor electrode 21, so that a region between the first sensor electrode 11 and the second sensor electrode 21 is wide (see (b) of FIG. 7).

In this case, no conductor line is formed in the region between the first sensor electrode 11 and the second sensor electrode 21, when viewed from above. Therefore, the region is high in light transmittance.

Accordingly, the region between the first sensor electrode 11 and the second sensor electrode 21 is different in light transmittance from the first sensor electrode 11 or the second sensor electrode 21. More specifically, the region is higher in light transmittance than the first sensor electrode 11 or the second sensor electrode 21.

With this configuration, according to an electronic device made up of the conventional touch panel substrate and a display device, in a case where a user of the electronic device looks at an image displayed by the display device, a brightness difference occurs due to a variation in light transmittance and, accordingly, a pattern corresponding to the region between the first sensor electrode 11 and the second sensor electrode 21 is visually recognized. This results in a deterioration of display quality (display performance) of such a displayed image.

In contrast, according to the touch panel substrate 2 of Embodiment 1, the shape of part of the outer edge of the first sensor electrode 11, which part is arranged side by side with the outer edge of the second sensor electrode 21 when viewed from above, is defined, as described above, by the ends of the first conductor lines 13, which ends have the respective wide width parts 40. Further, the shape of part of the outer edge of the second sensor electrode 21, which part is arranged side by side with the outer edge of the first sensor electrode 11 when viewed from above, is defined by the ends of the second conductor lines 14, which ends have the respective wide width parts 40.

In other words, in part of the outer edge of the first sensor electrode 11 which part is arranged side by side with the outer edge of the second sensor electrode 21 when viewed from above, the ends of the first conductor lines 13 of the first sensor electrode 11 have the respective wide width parts 40 each of which is wider than the other part of the first conductor lines 13 when view from above. Further, in part of the outer edge of the second sensor electrode 21 which part is arranged side by side with the outer edge of the first sensor electrode 11 when viewed from above, the ends of the conductor lines 14 of the second sensor electrode 21 have the respective wide width parts 40 each of which is wider than the other part of the second conductor lines 14 when view from above.

According to the touch panel substrate 2, the outer edge of the first sensor electrode 11 is arranged side by side with the outer edge of the second sensor electrode 21, when viewed from above (see (a) of FIG. 8).

This causes conductor lines uniformly arranged in a net-like pattern when viewed from above to be formed by the first conductor lines 13 and the second conductor line 14. Therefore, the touch panel substrate 2 has uniform in-plane light transmittance.

Note that it is preferable that the wide width parts 40 of the conductor lines 13 overlap the wide width parts 40 of the second conductor lines 14 when viewed from above. This is because, by the wide width parts 40 overlapping each other, it is possible to suppress ununiformity of the light transmittance which ununiformity is caused by the wide width parts 40 themselves.

Furthermore, according to the touch panel substrate 2 of Embodiment 1, it is possible to maintain uniformity of the light transmittance in a surface of the touch panel substrate 2, even in a case where the first electrode layer 10 and the second electrode layer 20 are adhered to each other without being properly aligned.

This will be described below in detail.

According to the first electrode layer 10 of the touch panel substrate 2 of Embodiment 1, an end of the first sensor electrode 11 at which end the wide width parts 40 are provided is lower in light transmittance than a vicinity of the center of the first sensor electrode 11. Similarly, according to the second electrode layer 20, an end of the second sensor electrode 21 at which end the wide width parts 40 are provided is lower in light transmittance than a vicinity of the center of the second sensor electrode 21.

In a case where the first sensor electrode 11 and the second sensor electrode 21 are provided so as to be apart from each other when viewed from above, the region (space) between the first sensor electrode 11 and the second sensor electrode 21 is high in light transmittance because no conductor line is provided in the region. However, as described above, the end of the first sensor electrode 11 and the end of the second sensor electrode 21 are each low in light transmittance.

Therefore, in a case where the end of the first sensor electrode 11, the space, and the end of the second sensor electrode 21 are regarded as a boundary region when viewed from above, high light transmittance of the space and low light transmittance of the ends of the first sensor electrode 11 and the second sensor electrode 21 are cancelled out in the boundary region.

This allows a variation in light transmittance to be reduced and small between (i) the boundary region and (ii) the vicinity of the center of the first sensor electrode 11 and the vicinity of the center of the second sensor electrode 21. That is, it is possible to suppress ununiformity of the light transmittance of an entire detection surface of the touch panel substrate 2

It is thus possible to improve uniformity of transmittance for light that travels in a direction perpendicular to the first electrode layer 10 and the second electrode layer 20. Therefore, according to the electronic device 1 made up of the touch panel substrate 2 and the display device 3, in a case where a user of the electronic device 1 looks at an image displayed by the display device 3, it is possible to cause a difference in brightness, between (i) a vicinity of the region between the electrodes and (ii) the vicinity of the center of the electrode, to be at or below a limit above which a human can recognizes the difference.

That is, it is possible to cause a pattern, corresponding to the end of the first sensor electrode 11 or the second sensor electrode 21, or a pattern, corresponding to the region between the first sensor electrode 11 and the second sensor electrode 21, not to be easily recognized visually, and possible to suppress a deterioration of display quality of a displayed image.

<Wide Width Parts>

Figure 9:
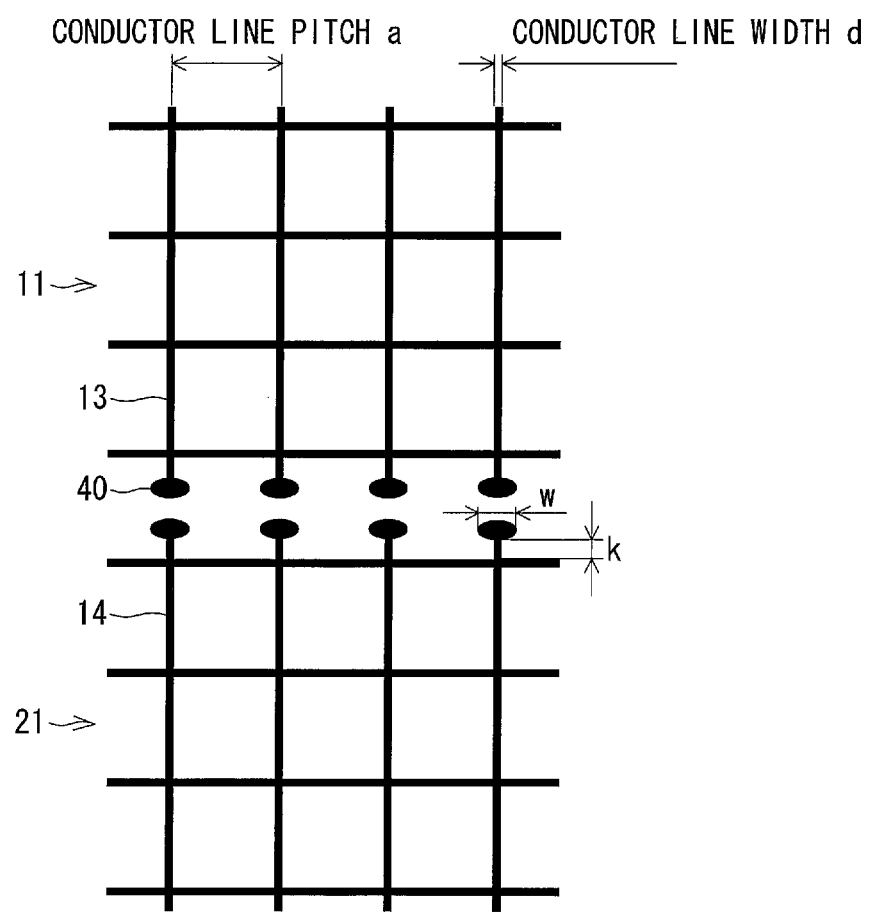
FIG. 9 is a plan view illustrating part of each of electrode layers of the touch panel substrate for explaining a size of each of wide width parts.

Here, a size of each of the wide width parts 40 which size is preferable for the touch panel substrate 2 of Embodiment 1 will be described below. FIG. 9 is a plan view illustrating part of each of electrode layers of the touch panel substrate 2 for explanation of the size of each of the wide width parts 40.

A human recognizes a brightness difference as a pattern by sensing the brightness difference with his/her eyes. In general, resolution of a human eye is between 70 µm and 80 µm. However, even in a case where an object has a size of not more than 70 µm, a human is capable of visually recognizing the object when a difference, between (i) brightness in a visual field of the human and (ii) average brightness around the object, is a given level or more.

In a case where ends of conductor lines have respective wide width parts 40 as in the touch panel substrate 2 of Embodiment 1, a region where the wide width parts 40 are provided is low in light transmittance. Namely, the wide width parts 40 themselves cause ununiformity of the light transmittance. This results in that a brightness difference occurs between (i) the region where the wide width parts 40 are provided and (ii) a region where no wide width part 40 is provided.

In this case, in a case where the brightness difference is a given level or more, the brightness difference is sensed by the eyes of the user of the electronic device 1 including the touch panel substrate 2, and the wide width parts 40 may be recognized as a pattern.

In view of this, each of the wide width parts 40 preferably has a size in such a range that a brightness difference is not sensed by the eyes of the user and the wide width parts 40 are not recognized as a pattern.

In regard to the touch panel substrate 2 of Embodiment 1, a brightness difference corresponds to an aperture ratio, and the aperture ratio is based on a ratio of (i) an area of the region where no conductor line is provided to (ii) an area of the whole region of an electrode layer.

Here, an aperture ratio of the region of the electrode layer in which region no wide width part 40 is provided is expressed by the following Expression:

$$(a^2-2ad)/a^2 \qquad \text{Expression (1)}$$

where, when viewed from above, "a" denotes a conductor line pitch indicative of an interval between adjacent ones of the conductor lines, and "d" denotes a conductor line width indicative of a width of each of the conductor lines (see FIG. 9).

Further, an aperture ratio of the boundary region (the region where the wide width parts 40 are provided) is expressed by the following Expression:

$$(a^2-2ad-2S)/a^2 \qquad \text{Expression (2)}$$

where, when viewed from above, "S" denotes an area of each of the wide width parts 40.

A range of the area "S" of each of the wide width parts 40 is calculated in which range a brightness difference (contrast difference), between (i) brightness based on the aperture ratio expressed by the Expression (1) and (ii) brightness based on the aperture ratio expressed by the Expression (2), is not sensed and is not recognized as a pattern.

Contrast sensitivity is expressed with the use of a maximum value (Max) and a minimum value (Min) of brightness. That is, the contrast sensitivity is expressed by (Max+Min)/(Max−Min).

Here, in a case where the contrast sensitivity is replaced with a difference between the aperture ratios by replacing
(i) Max with $(a^2-2ad)/a^2$ and
(ii) Min with $(a^2-2ad-2S)/a^2$,
the contrast sensitivity is expressed by $$\{a(a-2d)-S\}/S.$$

The inventors of the present invention conducted a visual experiment so as to verify an upper limit of the area "S" of each of the wide width parts 40 to which upper limit each of the wide width parts 40 is not visually recognized as a pattern on the touch panel substrate 2 of Embodiment 1.

Figure 10:
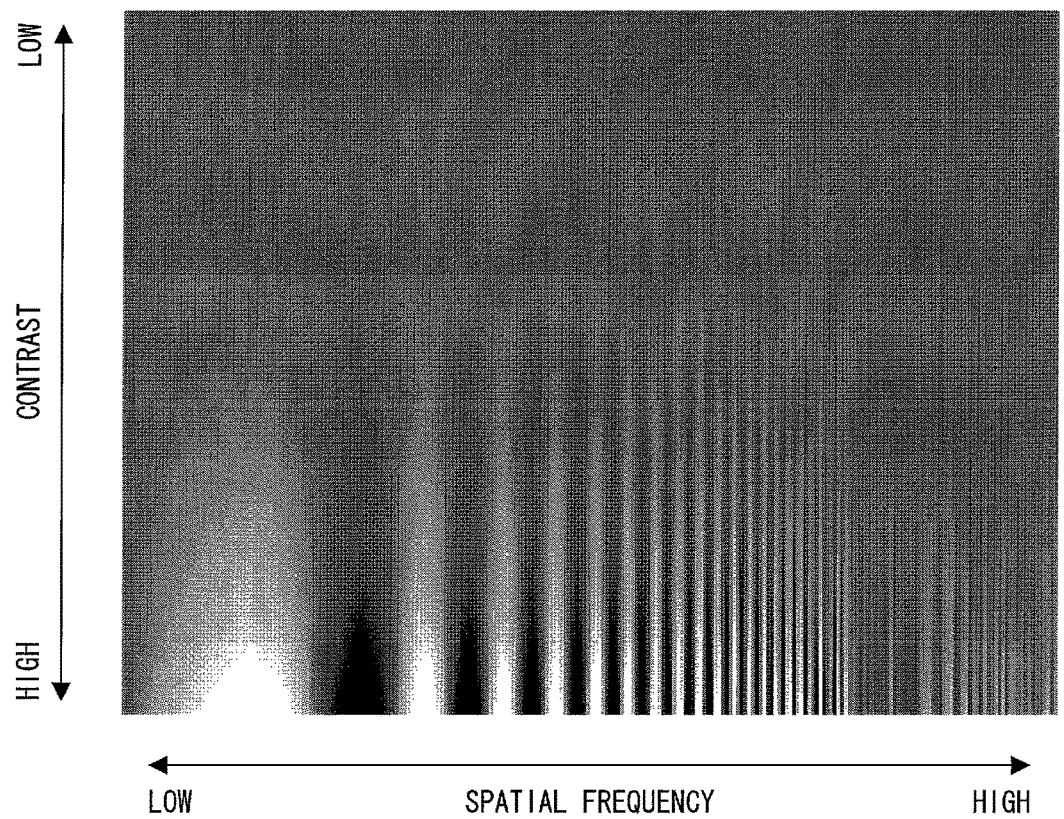
FIG. 10 is a Campbell chart used in a visual experiment.

FIG. 10 is a Campbell chart used in the visual experiment.

In the Campbell chart of FIG. 10, a stripe pattern is shown which is obtained by changing a spatial frequency along a horizontal axis and changing contrast along a vertical axis.

The Campbell chart of FIG. 10 was viewed from the front thereof from a distance of 50 cm, and contrast visible at each spatial frequency is visually measured. Such visual measurement is carried out at spatial frequencies in a range of 0.5 cpd to 30 cpd (cycles/degree), in consideration of a size of a general sensor electrode, a conductor line pitch, and the like.

As a result, an allowable limit to which the stripe pattern is not visually recognized is 134 by the contrast sensitivity. Note that, at spatial frequencies outside the range of 0.5 cpd to 30 cpd, the contrast sensitivity corresponding to the allowable limit is lower than 134. Therefore, in a case where the contrast sensitivity is not less than 134, the stripe pattern is not visually recognized and visually allowed.

Thus, in a case where $$\{a(a-2d)-S\}/S \geq 134,$$

the wide width parts 40 are not visually recognized on the touch panel substrate 2 of Embodiment 1.

That is, the area "S" of each of the wide width parts 40 with which area the each of the wide width parts 40 is not visually recognized is $$S \leq a(a-2d)/135.$$

Moreover, a width W of each of the wide width parts 40 is more preferably not more than 50 μm when viewed from above. This allows the wide width parts 40 not to be easily recognized visually.

In view of the above, according to the first electrode layer 10 and the second electrode layer 20 of Embodiment 1, the conductor line pitch is set to 500 μm, the conductor line width is set to 10 μm, and each of the wide width parts 40 is set to have a shape of an ellipse having a major axis of 50 μm and a minor axis of 40 μm.

Each of the intersections of the conductor lines may be wider than the other part of the conductor lines. Therefore, in a case where the wide width parts 40 are close to the intersections of the conductor lines, the light transmittance is excessively low in the first sensor electrode 11, the second sensor electrode 21, and the boundary region. This may cause the boundary region to be visually recognized.

In view of the above, by setting, to not less than 100 μm, a distance "k" between a wide width part 40 and an intersection of the first conductor lines 13 or the second conductor lines 14, it is possible to prevent a boundary, between the first sensor electrode 11 and the second sensor electrode 21, from being visually recognized.

<Shape of Wide Width Part>

Figure 11:
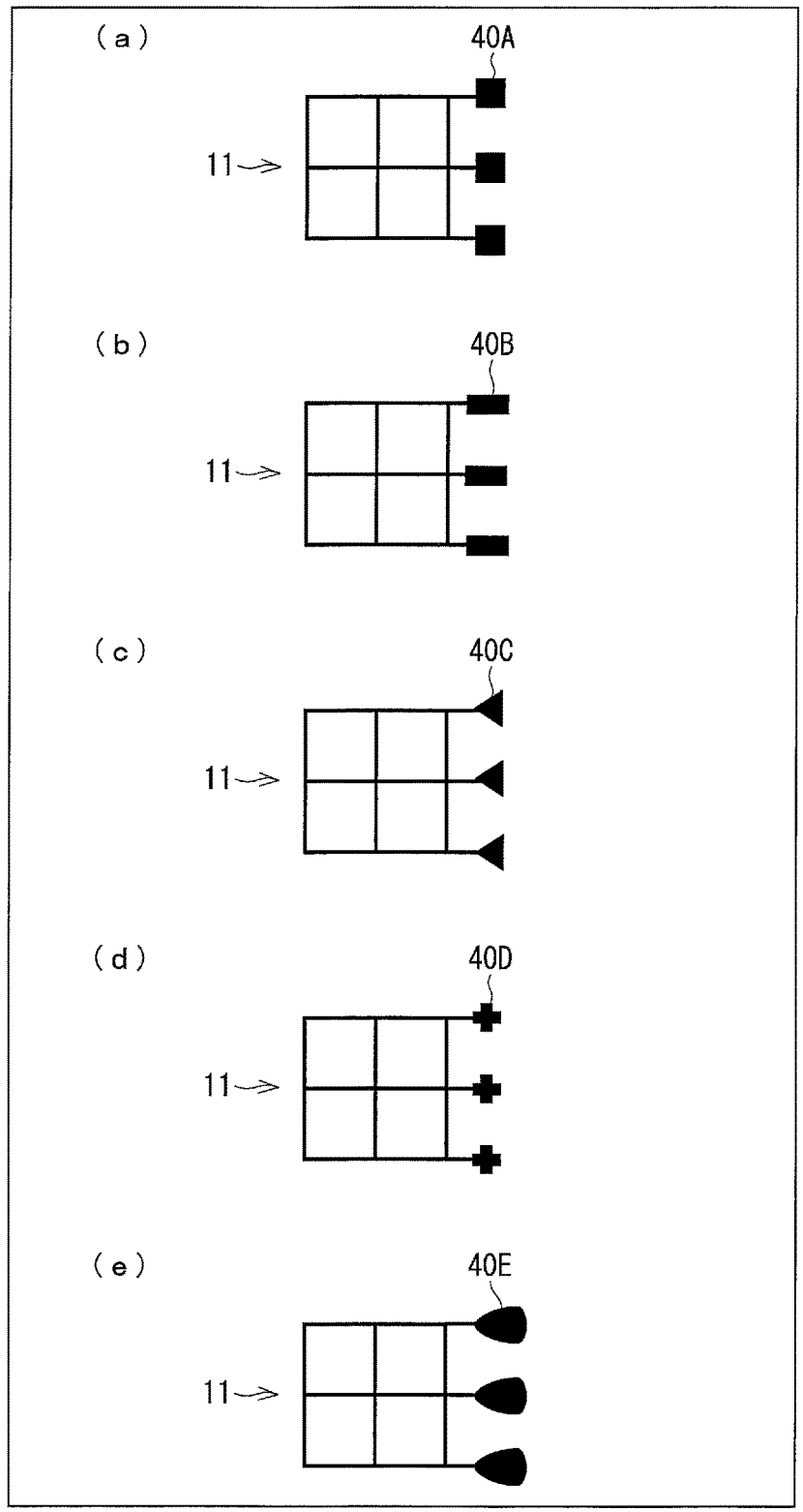
FIG. 11 is a plan view illustrating part of a first sensor electrode for illustrating another example shape of each of the wide width parts of the touch panel substrate of Embodiment 1.

FIG. 11 is a plan view illustrating part of the first sensor electrode 11 for illustrating another example shape of each of the wide width parts 40. The description, such that each of the wide width parts 40 has a shape of an ellipse, has been given above. However, each shape of the wide width parts 40 is not limited to the elliptic.

Like a first sensor electrode 11A illustrated in (a) of FIG. 11, wide width parts 40a can be, for example, provided each of which has a 35-μm-square shape. Like a first sensor electrode 11B illustrated in (b) of FIG. 11, wide width parts 40b can be, for example, provided each of which has a rectangular shape measuring 40 μm×25 μm. Like a first sensor electrode 11C illustrated in (c) of FIG. 11, wide width parts 40c can be provided each of which has a triangular shape. Like a first sensor electrode 11D illustrated in (d) of FIG. 11, wide width parts 40d can be provided each of which has a cross shape. Like a first sensor electrode 11E illustrated in (e) of FIG. 11, wide width parts 40e can be provided each of which has a semielliptic shape. Alternatively, a parallelogram shape, a rhombic shape, or the like can be employed as a shape of each of the wide width parts.

Similarly, the second sensor electrode 21 can alternatively have the wide width parts 40a illustrated in (a) of FIG. 11, 40b illustrated in (b) FIG. 11, 40c illustrated in (c) FIG. 11, 40d illustrated in (d) FIG. 11, or 40e illustrated in (e) FIG. 11.

Even with the above configuration, the electronic device 1 made up of the touch panel substrate 2 and the display device 3 is capable of (i) causing a pattern (bright line) corresponding to the region between the electrodes not to be easily recognized visually by a viewer of an image displayed by the display device 3 and (ii) suppressing a deterioration of display quality of such a displayed image.

Embodiment 2

Figure 12:
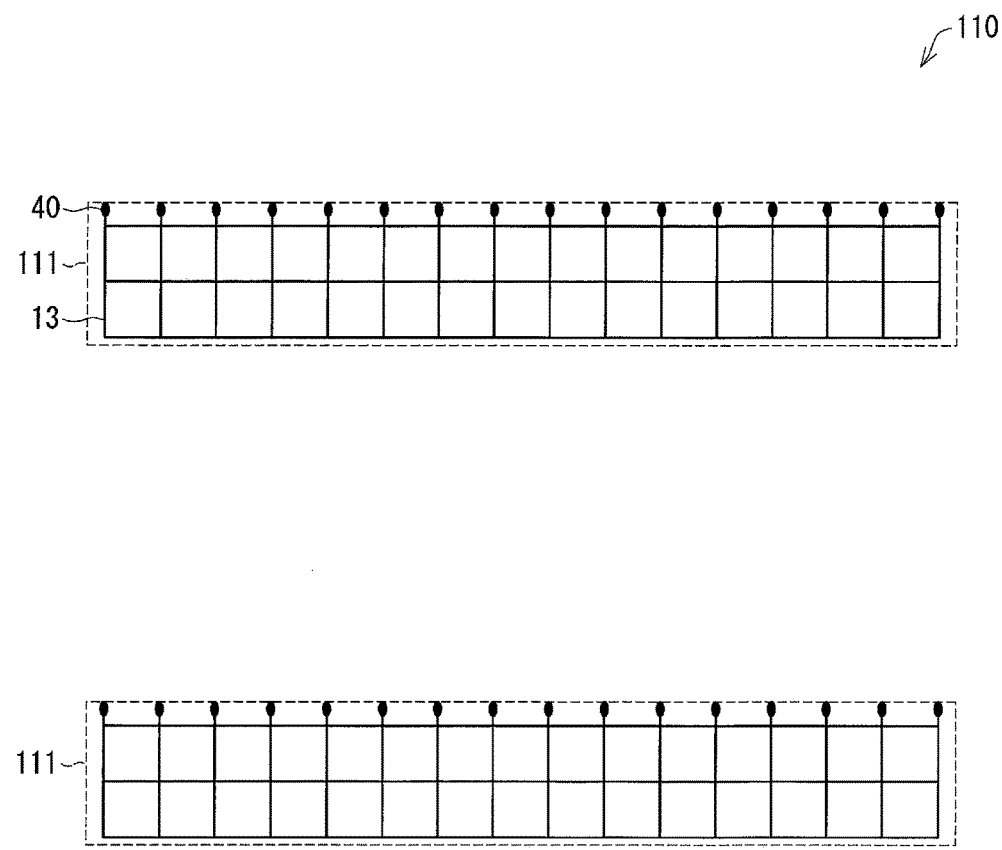
FIG. 12 is a plan view illustrating, in detail, a configuration of a first electrode layer of a touch panel substrate of Embodiment 2.
Figure 13:
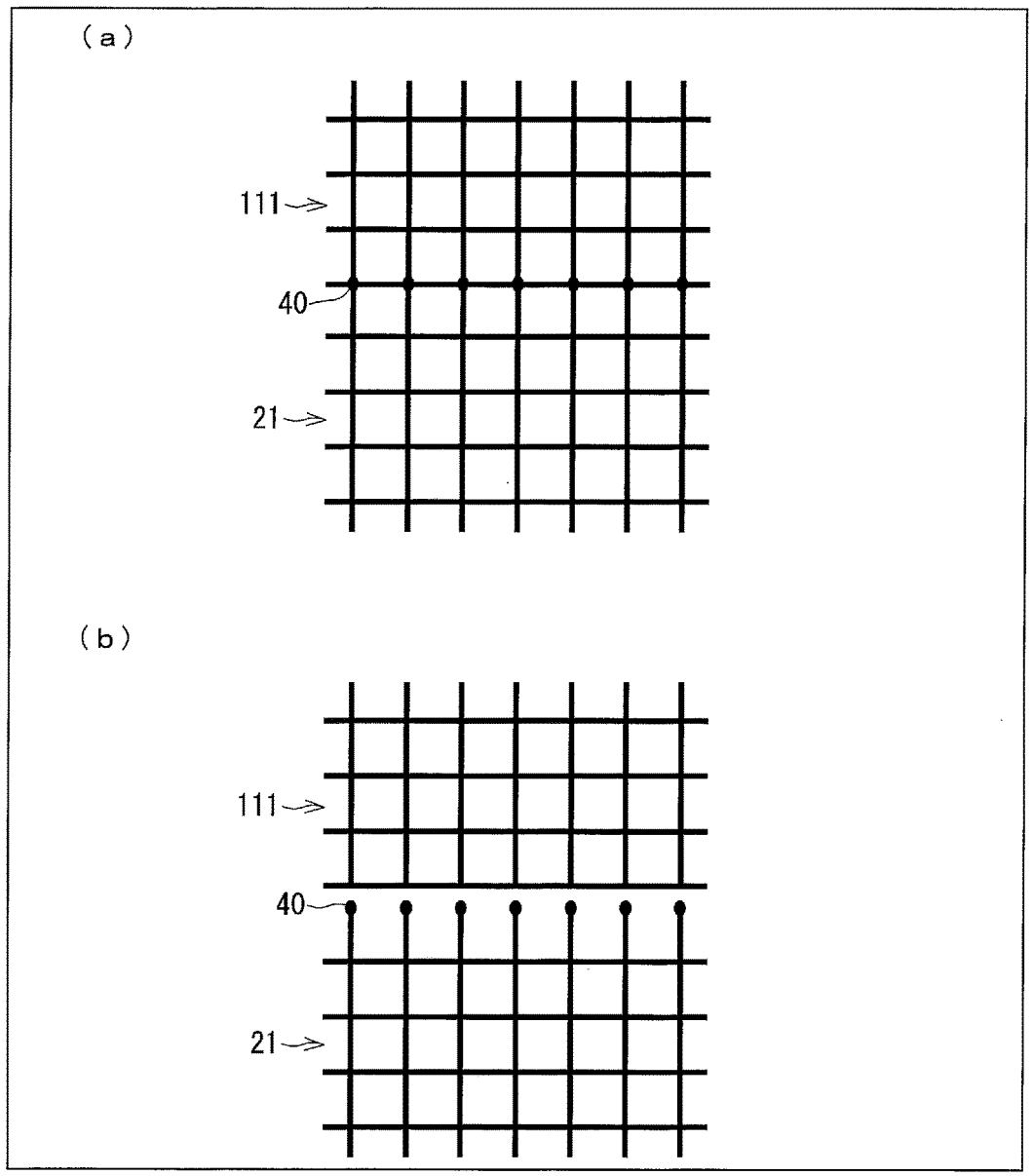
FIG. 13 is a view for explaining light transmittance of the touch panel substrate of Embodiment 2. (a) of FIG. 13 is a plan view illustrating part of the touch panel substrate in which the first electrode layer and a second electrode layer are properly aligned. (b) of FIG. 13 is a plan view illustrating part of the touch panel substrate in which the first electrode layer and the second electrode layer are not properly aligned.

The following description will discuss another embodiment of the present invention with reference to FIGS. 12 and 13. Note that, for convenience, identical reference numerals will be given to respective members having functions identical to those of the members described in Embodiment 1, and descriptions of the members will be omitted.

FIG. 12 is a plan view illustrating, in detail, a configuration of a first electrode layer 110 of Embodiment 2.

According to a first electrode layer of the present invention, each electrode which has an outer edge in a rectangular shape is only necessary to be configured such that ends of first conductor lines 13, which ends define any one of sides of the electrode which sides face respective adjacent electrodes, have respective wide width parts 40.

As illustrated in FIG. 12, each electrode included in the first electrode layer 110 of Embodiment 2 is configured such that ends of first conductor lines 13, which ends define one of two sides of the each electrode which sides face respective adjacent electrodes, have respective wide width parts 40.

FIG. 13 is a view for explaining light transmittance of a touch panel substrate of Embodiment 2. (a) of FIG. 13 is a plan view illustrating part of the touch panel substrate in which a first electrode layer and a second electrode layer are properly aligned. (b) of FIG. 13 is a plan view illustrating part of the touch panel substrate in which the first electrode layer and the second electrode layer are not properly aligned.

As illustrated in (b) of FIG. 13, it is only necessary that ends of conductor lines, which ends define any one of shapes of outer edges, arranged side by side, of a first sensor electrode 111 and a second sensor electrode 21, at least have respective wide width parts 40 (see (b) of FIG. 13).

This allows a variation in light transmittance to be reduced and small between (i) a boundary region and (ii) a vicinity of the center of the first sensor electrode 11 and a vicinity of the center of the second sensor electrode 21. That is, it is possible to suppress ununiformity of the light transmittance of an entire detection surface of the touch panel substrate 2.

Therefore, even in a case of the touch panel substrate 102 of Embodiment 2, an electronic device 1 made up of the touch panel substrate 102 and a display device 3 is capable of (i) causing a pattern (bright line) corresponding to a region between electrodes not to be easily recognized visually by a viewer of an image displayed by the display device 3 and (ii) suppressing a deterioration of display quality of such a displayed image.

<Method of Forming Electrode Layer>

Figure 14:
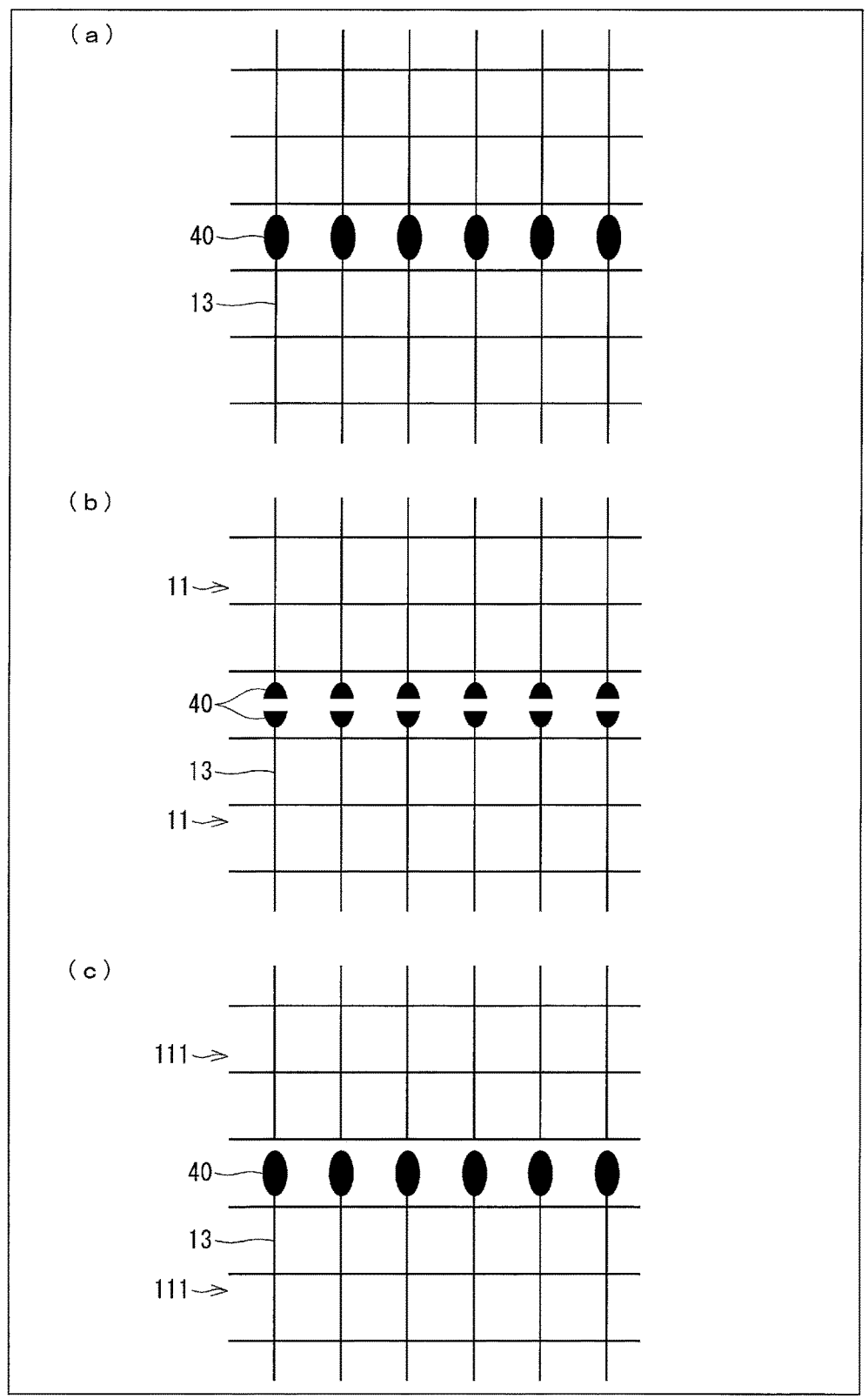
FIG. 14 is a plan view illustrating part of a step of forming a first electrode layer of a touch panel substrate of Embodiment 1 or 2.

A method of manufacturing a touch panel substrate 2 of Embodiment 1 or 2 will be described below. The method of manufacturing the touch panel substrate 2 includes a step of forming a first electrode layer 10. FIG. 14 is a plan view illustrating part of the step of forming the first electrode layer 10.

The step of forming the first electrode layer 10 of Embodiment 1 or 2 can include the following step.

That is, first, first conductor lines 13, uniformly arranged in a net-like pattern on an entire surface of the first electrode layer 10, are arranged so as to partially have wide width parts 40 (see (a) of FIG. 14). In this case, the wide width parts 40 are provided in a row in a direction parallel to a direction in which first sensor electrodes 11 is to extend. Note that the wide width parts 40 are preferably provided at respective positions other than intersections at which the first conductor lines 13 intersect each other.

Next, the first conductor lines 13 are divided (cut) in across the wide width parts 40 along an electrode shape (see (b) of FIG. 14). This causes a plurality of electrodes for a touch sensor to be formed.

By use of a simple method, that is, by dividing the first conductor lines 13 across the wide width parts 40 along the plurality of electrodes, pairs of ends of the conductor lines 13 are formed, a shape of each outer edge of the plurality of electrodes are defined by ends of the conductor lines 13, and each of the pairs of ends of the conductor lines 13 are both caused to have the respective wide width parts 40.

By carrying out the above step, it is possible to form electrodes corresponding to the first sensor electrodes 11 of Embodiment 1 and, accordingly, possible to form the first electrode layer 10 of Embodiment 1.

Note that, when the first conductor lines 13 are divided, the first conductor lines 13 can be alternatively divided so that a dividing line passes by ends of the wide width parts 40 as illustrated in (c) of FIG. 14. This makes it possible to form electrodes corresponding to first sensor electrodes 111, illustrated in FIG. 12, of Embodiment 2 and, accordingly, possible to form the first electrode layer 110.

Note here that, in a case where the conductor lines are formed by etching, each of intersections of the conductor lines may be greater in width (wider) than the other part of the conductor lines. Therefore, in a case where (i) at least any one of the first electrode layer 10 and the second electrode layer 20 is arranged such that the conductor lines are divided across the intersections of the conductor lines and (ii) the first electrode layer 10 and the second electrode layer 20 are misaligned, (a) the intersections of the conductor lines of the at least any one of the first electrode layer 10 and the second electrode layer 20 and (b) the wide width parts of the other of the first electrode layer 10 and the second electrode layer 20 affects each other when viewed from above, so that ununiformity may occur in aperture ratio (light transmittance).

On the other hand, in a case where the conductor lines are divided so as to avoid the intersection of the conductor lines as illustrated in (b) of FIG. 14 (that is, in a case where the conductor lines are divided across arms of the conductor lines), it is possible to reduce ununiformity of the aperture ratio (light transmittance) even in a case where the first electrode layer 10 and the second electrode layer 20 are misaligned.

By carrying out a similar method, it is also possible to form the second electrode layer 20.

Note that the method of manufacturing the touch panel substrate 2 of Embodiment 1 or 2 is not always necessary to include the step of dividing the conductor lines which are arranged in advance so as to partially have the wide width parts, as described above. The method can alternatively include (i) a step of dividing conductor line patterns having no wide width part 40 and (ii) a step of providing, as auxiliary shapes, the wide width parts 40 to portions of the conductor line patterns across which portions the conductor line patterns are divided.

Note, however, that such a method of separately providing, as additional structures, the wide width parts 40 to the portions (space) of the conductor lines, across which portions the conductor lines are divided, is difficult in terms of a manufacturing technique because the space is narrow. According to such a structure that a conductor line pitch is narrow, this may cause the conductor line patterns to be ununiform.

On the other hand, by arranging the ends of the first conductor lines 13, which ends are obtained by dividing the first conductor lines 13, to have the wide width parts 40 so as to form the first electrode layer 110, as illustrated in FIG. 14, it is possible to form the first electrode layer 110, having uniform conductor line patterns, without expanding the space. Such a way to form the first electrode layer 110 is applicable to conductor line patterns in which a conductor line pitch is narrow, and is favorable to maintain uniformity of the conductor line patterns.

Another method of manufacturing a touch panel substrate 2 of Embodiment 1 or 2 will be described below. The method of manufacturing the touch panel substrate 2 can include the following step so as to form a first electrode layer 10.

First, a thin film metal layer is formed uniformly on a substrate. As metal, for example, copper can be used.

Next, the metal layer is subjected to photolithography with the use of a mask, which is patterned after a net-like pattern having wide width parts and after shapes of the first sensor electrodes 11, so that the first electrode layer 10 is formed.

Specifically, the photolithography can be carried out as follows. First, a positive photoresist is, for example, applied on the metal layer. Next, the metal layer, on which the positive photoresist is applied, is covered with a mask having a light-blocking part which is formed in a net-like pattern having wide width parts and which is hollowed out along outer edges of electrodes, and is then exposed. Thereafter, the metal layer is subjected to etching.

With this method, conductor lines uniformly arranged on the substrate in the net-like pattern are divided in shapes of electrodes, so that a plurality of electrodes for a touch sensor are formed and, accordingly, an electrode layer including the plurality of electrodes for the touch sensor is formed.

Embodiment 3

Figure 15:
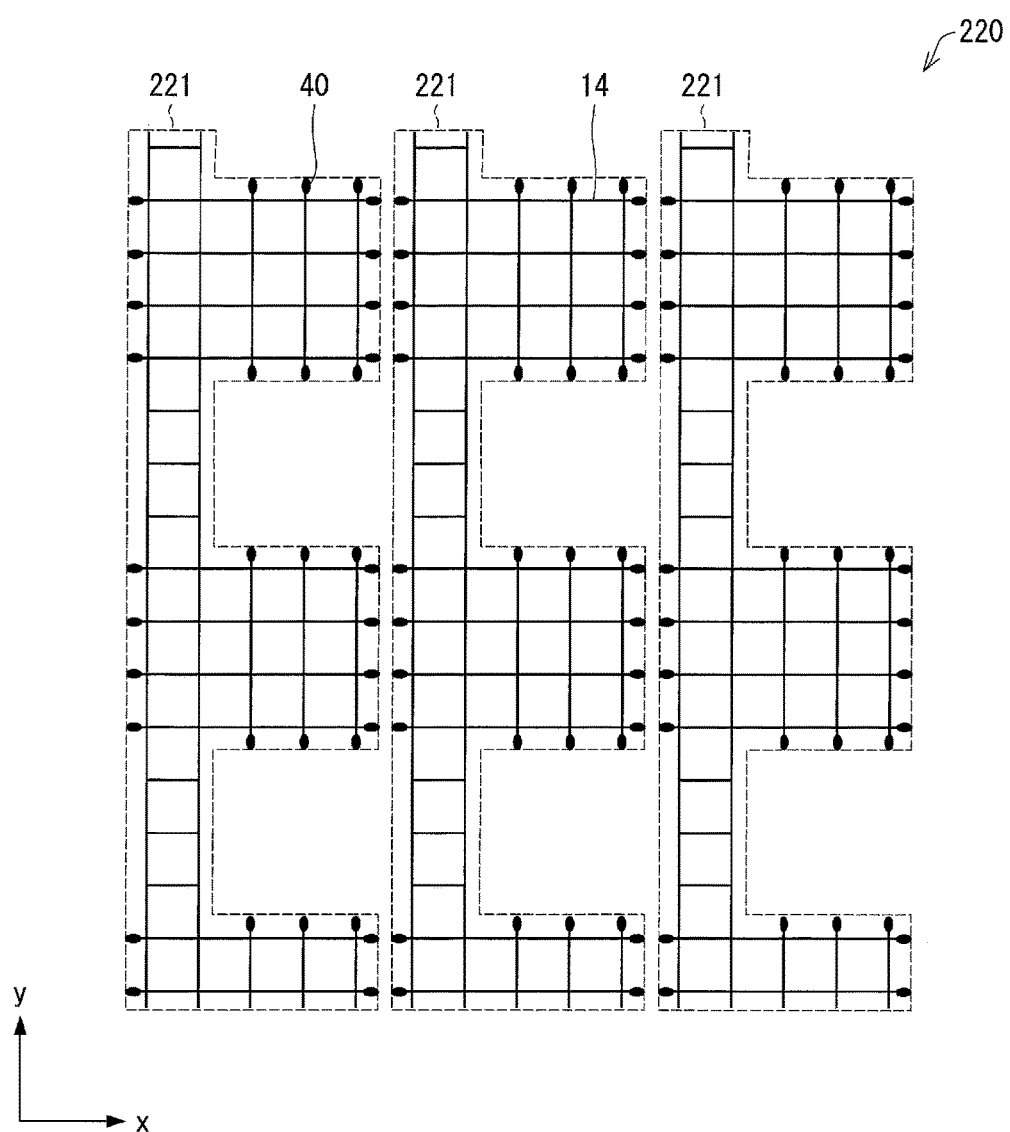
FIG. 15 is a plan view illustrating, in detail, a configuration of a second electrode layer of a touch panel substrate of Embodiment 3.

The following description will discuss another embodiment of the present invention with reference to FIG. 15. Note that, for convenience, identical reference numerals will be given to respective members having functions identical to those of the members described in the foregoing Embodiments, and descriptions of the members will be omitted.

<Second Sensor Electrodes>

FIG. 15 is a plan view illustrating, in detail, a configuration of a second electrode layer 220 of Embodiment 3.

Similar to the second electrode layer 20 of Embodiment 1, second sensor electrodes 221, each including second conductor lines 14 arranged on an identical plane surface in a net-like pattern, are formed in the second electrode layer 220 of Embodiment 3.

Further, similar to the second sensor electrodes of Embodiment 1, each second sensor electrode 221 of Embodiment 3 is configured such that a shape (side) of part of an outer edge of the second sensor electrode 221, which part is parallel to an X direction in FIG. 15, is defined by ends of second conductor lines 14.

Furthermore, a shape (side) of part of the outer edge of the second sensor electrode 221, which part is parallel to a Y direction in FIG. 15 and which closely faces an adjacent second sensor electrode 221, is also defined by ends of the second conductor lines 14.

The ends of the second conductor lines 14 have respective wide width parts 40 each of which is wider than the other part of the second conductor lines 14.

<Uniformity of Transmittance>

According to a touch panel substrate 202 of Embodiment 3, similar to the touch panel substrate 2 of Embodiment 1, it is possible to uniform in-plane light transmittance of a touch panel substrate 2 even in a case where a first electrode layer and the second electrode layer 220 are adhered to each other without being properly aligned.

With this configuration, an electronic device 1 made up of the touch panel substrate 202 and a display device 3 is capable of (i) causing a pattern corresponding an end of a first sensor electrode 211 or the second sensor electrode 221 or a pattern corresponding to a region between the first sensor electrode 211 and the second sensor electrode 221 not to be easily recognized visually and (ii) suppressing a deterioration of display quality of a displayed image.

Note here that the second sensor electrodes 221 are formed in the second electrode layer 220, and the second sensor electrodes 221 are arranged at intervals so as to be electrically insulated from each other.

Therefore, a region between adjacent ones of the second sensor electrodes 221 is a space where no conductor line is provided. This partially causes an increase in aperture ratio of the conductor lines and causes light transmittance to be partially high. As a result, according to an electronic device made up of a touch panel substrate and a display device, a pattern corresponding to a region between electrodes may be visually recognized. This may result in a deterioration of a display quality (display performance) of a displayed image.

On the other hand, according to the second electrode layer 220 of Embodiment 3, a shape (side) of part of the outer edge of the second sensor electrode 221, which part closely faces the adjacent second sensor electrode 221, is defined by the ends of the second conductor lines 14. The ends of the conductor lines 14 have the respective wide width parts 40.

Therefore, in a case where ends of adjacent two of the second sensor electrodes 221 and the space are regarded as a boundary region, high light transmittance of the space and low light transmittance of the ends of the adjacent two of the second sensor electrodes 22 are cancelled out in the boundary region.

This allows a variation in light transmittance to be reduced and small between (i) the boundary region and (ii) a vicinity of the center of the second sensor electrode 221. That is, it is possible to suppress ununiformity of the light transmittance of the second electrode layer 220 as a whole.

It is thus possible to improve uniformity of transmittance for light that travels in a direction perpendicular to the second electrode layer 220. Therefore, according to the electronic device 1 made up of the touch panel substrate 202 and the display device 3, in a case where a user of the electronic device 1 looks at an image displayed by the display device 3, it is possible to cause a difference in brightness, between (i) a vicinity of the region between the electrodes and (ii) the vicinity of the center of the electrode, to be at or below a limit above which a human can recognizes the difference.

That is, it is possible to cause a pattern corresponding to the boundary region not to be easily recognized visually, and possible to suppress a deterioration of display quality of a displayed image.

Embodiment 4

The following description will discuss another embodiment of the present invention with reference to FIGS. 16 through 22. Note that, for convenience, identical reference numerals will be given to respective members having functions identical to those of the members described in the foregoing Embodiments, and descriptions of the members will be omitted.

<Electrode Layer>

Figure 17:
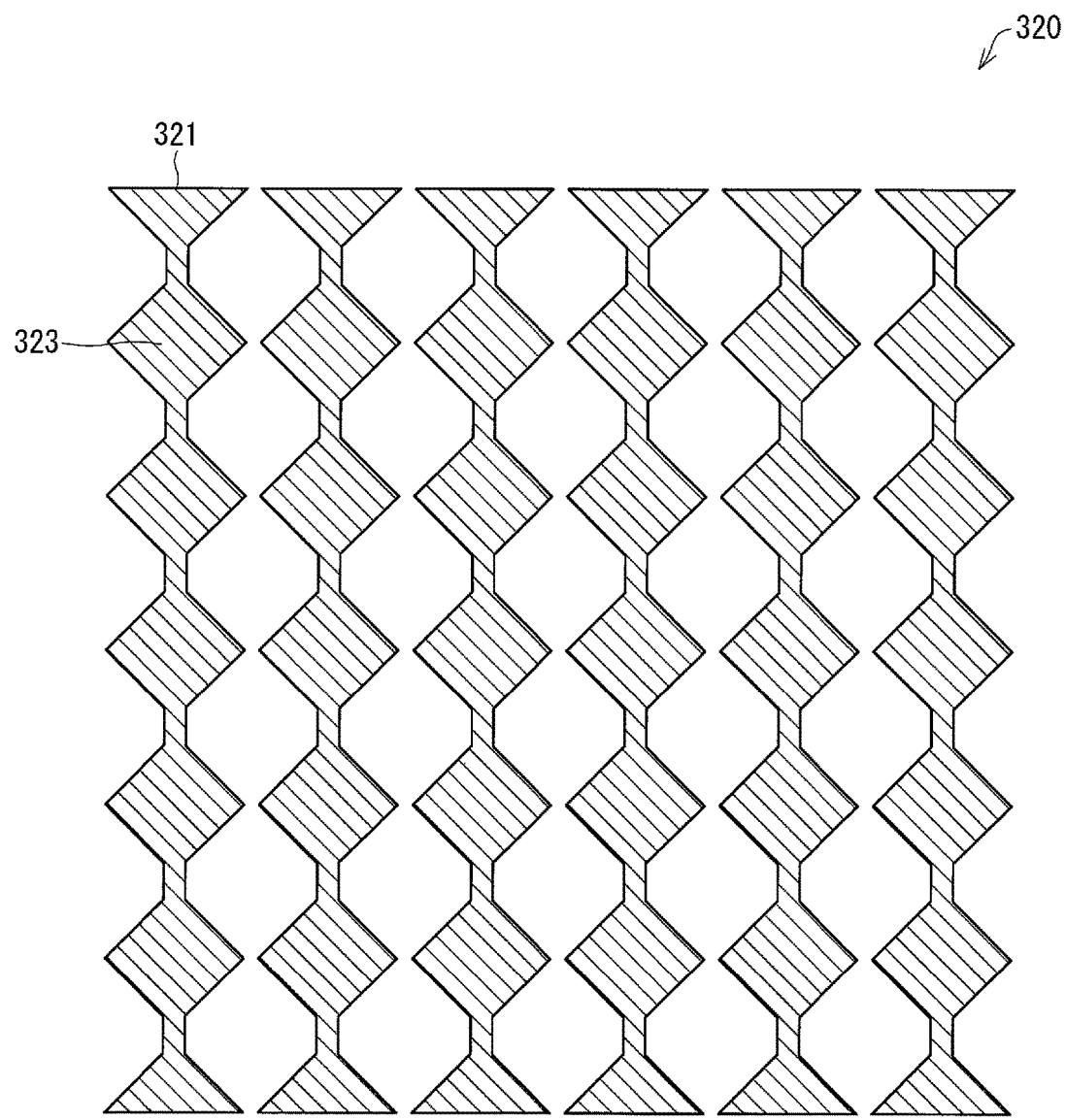
FIG. 17 is a plan view illustrating a configuration of a second electrode layer of the touch panel substrate of Embodiment 4.

FIG. 16 is a plan view illustrating a configuration of a first electrode layer 310 of a touch panel substrate of Embodiment 4. FIG. 17 is a plan view illustrating a configuration of a second electrode layer 320 of the touch panel substrate of Embodiment 4.

As illustrated in FIG. 16, the first electrode layer 310 of Embodiment 4 has first sensor electrodes 311 which extend in a lateral direction in FIG. 16. Each of the first sensor electrodes 311 has a plurality of grid electrodes 313 each having a quadrangular shape. Adjacent ones of the plurality of grid electrodes 313 are connected to each other via a vertex of each of the adjacent ones of the plurality of grid electrodes 313.

As illustrated in FIG. 17, the second electrode layer 320 of Embodiment 4 has second sensor electrodes 321 which extend in a longitudinal direction in FIG. 17. Each of the second sensor electrodes 321 has a plurality of grid electrodes 323 each having a quadrangular shape. Adjacent ones of the plurality of grid electrodes 323 are connected to each other via a vertex of each of the adjacent ones of the plurality of grid electrodes 323.

FIG. 18 is a plan view illustrating a configuration of a touch panel substrate 302 of Embodiment 4 which configuration is observed when the first electrode layer 310 is superimposed over the second electrode layer 320.

As illustrated in FIG. 18, the touch panel substrate 302 has such a structure that the first electrode layer 310 is superimposed over the second electrode layer 320 via a substrate 6 so that the first sensor electrodes 311 intersect the second sensor electrodes 321 when viewed from above. Further, when viewed from above, the plurality of grid electrodes 323 of each of the second sensor electrodes 321 are arranged between the plurality of grid electrodes 313 of each of the first sensor electrodes 311, when view from above. Further, the plurality of grid electrodes 313 of each of the first sensor electrodes 311 are arranged between the plurality of grid electrodes 323 of each of the second sensor electrodes 321.

As shown in a region Q which is illustrated in FIG. 18 and which is enclosed by a broken line, an outer edge of a first sensor electrode 311 and an outer edge of a second sensor electrode 321 are arranged side by side.

The touch panel substrate 302 of Embodiment 4 thus has (i) the first sensor electrodes 311 each having diamond patterns and (ii) the second sensor electrodes 321 each having diamond patterns.

<First Sensor Electrode>

Figure 19:
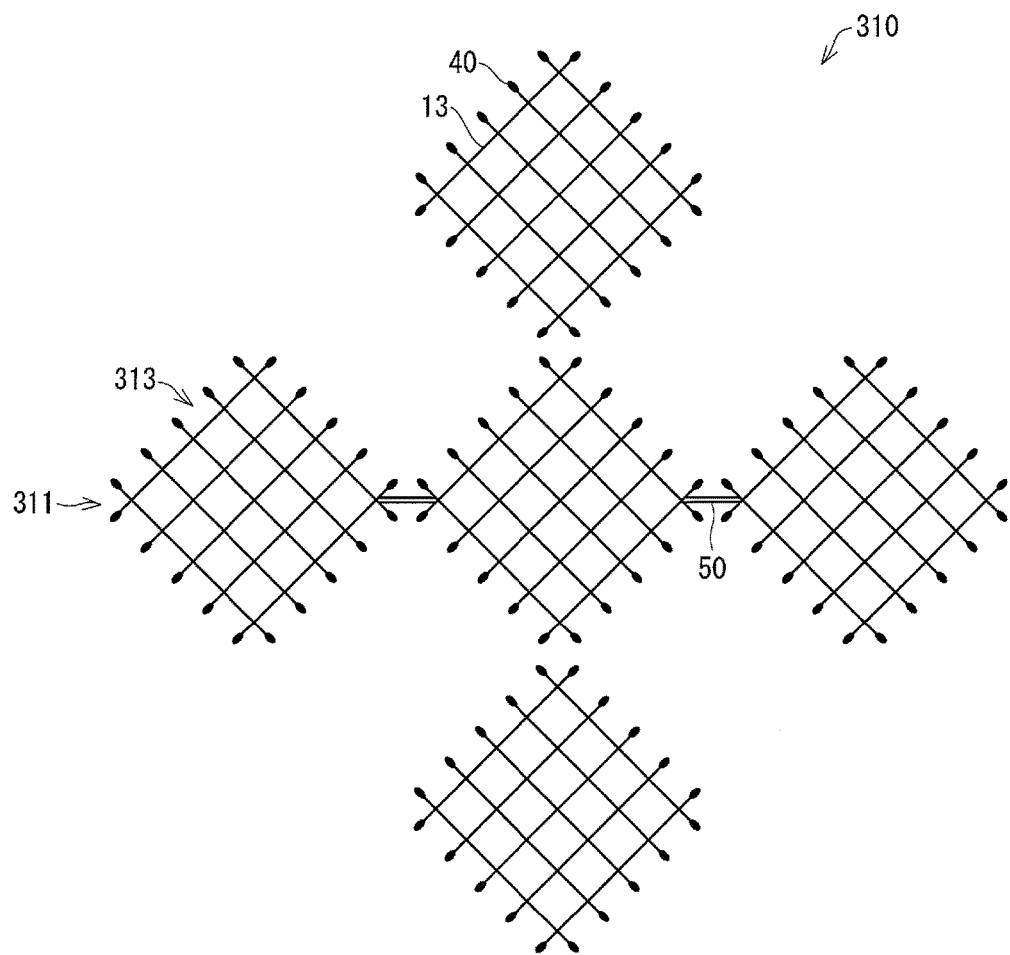
FIG. 19 is a plan view illustrating, in detail, the configuration of the first electrode layer of the touch panel substrate of Embodiment 4.

FIG. 19 is a plan view illustrating, in detail, the configuration of the first electrode layer 310 of Embodiment 4.

As illustrated in FIG. 19, the first sensor electrodes 311, each including first conductor lines 13 arranged on an identical plane surface in a net-like pattern, are formed in the first electrode layer 310. That is, the first conductor lines 13 constitute each of the first sensor electrodes 311.

The first conductor lines 13 included in one first sensor electrode 311 are electrically insulated from the first conductor lines 13 included in another first sensor electrode 311.

The first sensor electrode 311 has such a structure that adjacent ones of the plurality of grid electrodes 313 are connected to each other via a first bridge conductor line 50.

A shape of an outer edge of the first sensor electrode 311 is defined by ends of the first conductor lines 13. The ends of the first conductor lines 13, which ends define the shape of the outer edge of the first sensor electrode 311, have respective wide width parts 40.

<Second Sensor Electrode>

FIG. 20 is a plan view illustrating, in detail, the configuration of the second electrode layer 320 of Embodiment 4.

As illustrated in FIG. 20, the second sensor electrodes 321, each including the second conductor lines 14 arranged on an identical plane surface in a net-like pattern, are formed in the second electrode layer 320. That is, the second conductor lines 14 constitute each of the second sensor electrodes 321.

The second conductor lines 14 included in one second sensor electrode 321 are electrically insulated from the second conductor lines 14 included in another second sensor electrode 321.

The second sensor electrode 321 has such a structure that adjacent ones of the plurality of grid electrodes 313 are connected to each other via a second bridge conductor line 51.

A shape of an outer edge of the second sensor electrode 321 is defined by ends of the second conductor lines 14. The ends of the second conductor lines 14, which ends define the shape of the outer edge of the second sensor electrode 321, have respective wide width parts 40.

<Transmittance Uniformity>

Figure 21:
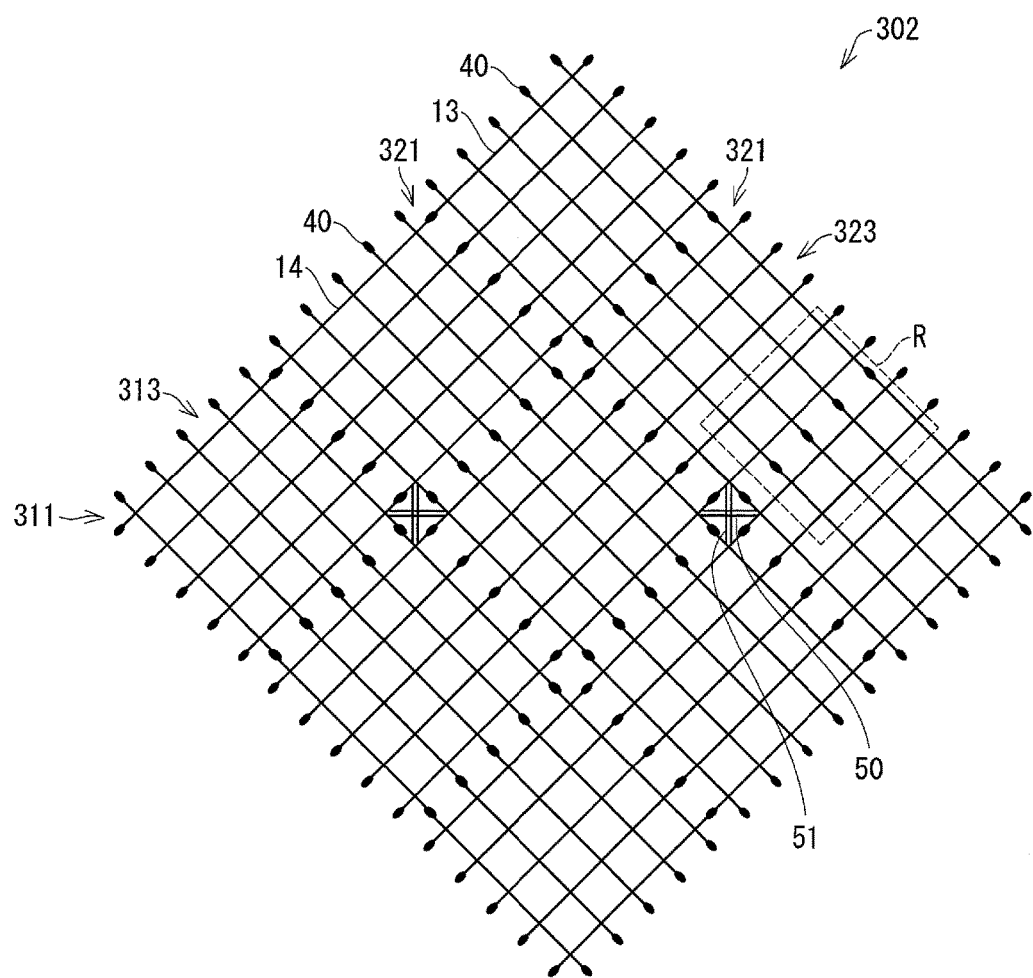
FIG. 21 is a plan view illustrating, in detail, the configuration of the touch panel substrate of Embodiment 4 which configuration is observed when the first electrode layer is superimposed over the second electrode layer.

FIG. 21 is a plan view illustrating, in detail, the configuration of the touch panel substrate 302 of Embodiment 4 which configuration is observed when the first electrode layer 310 is superimposed over the second electrode layer 320.

According to the touch panel substrate 302 of Embodiment 4, the first electrode layer 310 and the second electrode layer 320 are provided on respective different plane surfaces so as to sandwich the substrate 6, in such a manner that the wide width parts 40 of the first electrode layer 310 overlaps the wide width parts 40 of the second electrode layer 320, when viewed from above.

A region R which is illustrated in FIG. 21 and is enclosed by a broken line corresponds to the region Q which is illustrated in FIG. 18 and which is enclosed by the broken line. The region R is a region where the outer edge of the first sensor electrode 311 and the outer edge of the second sensor electrode 321 are arranged side by side, when viewed from above.

Figure 22:
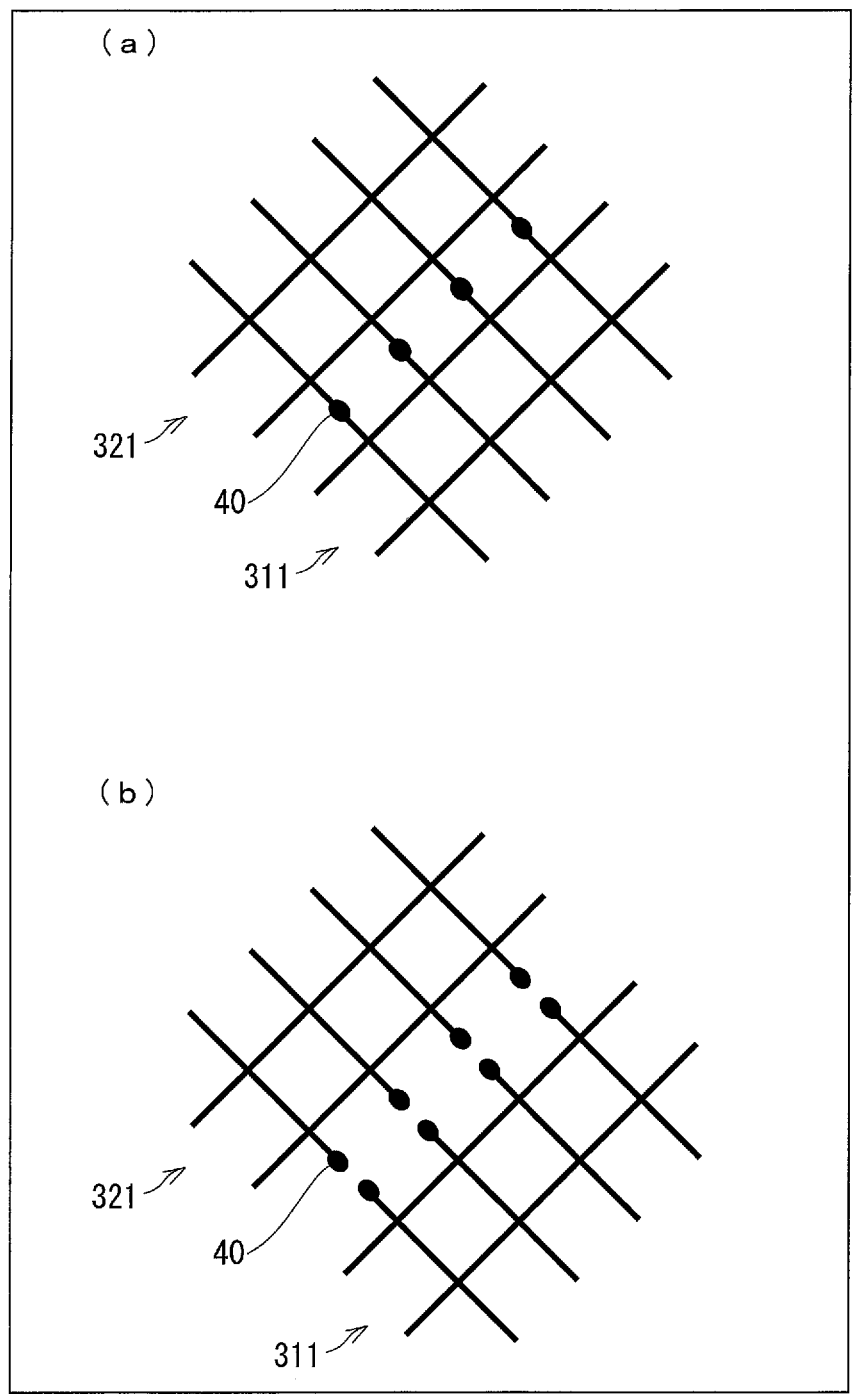
FIG. 22 is a view for explaining light transmittance of the touch panel substrate of Embodiment 4. (a) of FIG. 22 is a plan view illustrating part of the touch panel substrate in which the first electrode layer and the second electrode layer are properly aligned. (b) of FIG. 22 is a plan view illustrating part of the touch panel substrate in which the first electrode layer and the second electrode layer are not properly aligned.

FIG. 22 is a view for explaining light transmittance of the touch panel substrate 302 of Embodiment 4 and is an enlarged view of the region R which is illustrated in FIG. 21 and which is enclosed by the broken line.

(a) of FIG. 22 is a plan view illustrating part of the touch panel substrate 302 in which the first electrode layer 310 and the second electrode layer 320 are properly aligned. (b) of FIG. 22 is a plan view illustrating part of the touch panel substrate 302 in which the first electrode layer 310 and the second electrode layer 320 are not properly aligned.

As illustrated in FIG. 21 and (a) of FIG. 22, by the outer edge of the first sensor electrode 311 and the outer edge of the second sensor electrode 321 being arranged side by side when viewed from above, conductor lines uniformly arranged in a net-like pattern are formed by the first conductor lines 13 and the second conductor lines 14, when viewed from above. This causes the touch panel substrate 302 to have uniform in-plane light transmittance.

Meanwhile, even in a case where the first electrode layer 310 and the second electrode layer 320 are adhered to each other without being properly aligned as illustrated in (b) of FIG. 22, high light transmittance of a space and low light transmittance of ends of the first sensor electrode 311 and the second sensor electrode 321 are cancelled out in a boundary region.

This allows a variation in light transmittance to be reduced and small between (i) the boundary region and (ii) a vicinity of the center of the first sensor electrode 311 and a vicinity of the center of the second sensor electrode 321. That is, it is possible to suppress ununiformity of the light transmittance of an entire detection surface of the touch panel substrate 302.

Embodiment 5

Figure 23:
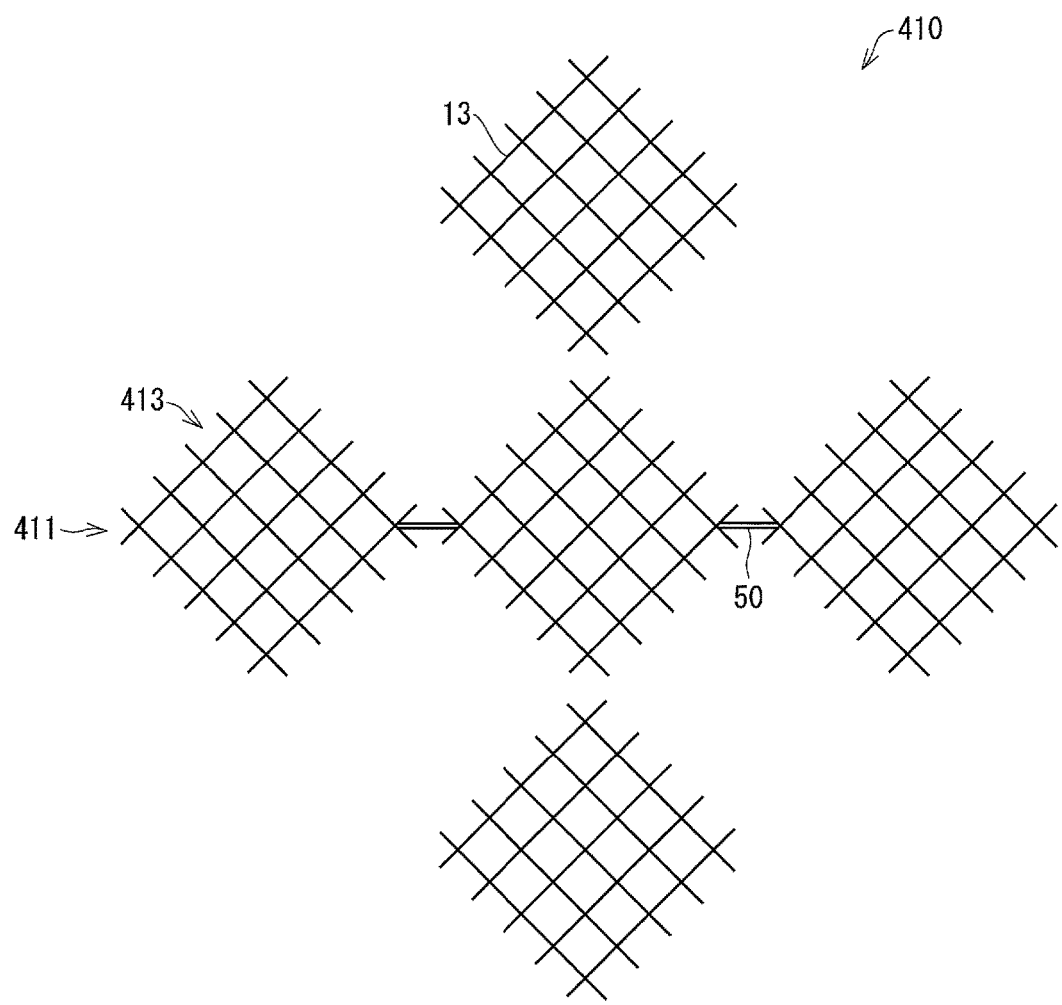
FIG. 23 is a plan view illustrating, in detail, a configuration of a first electrode layer of a touch panel substrate of Embodiment 5.
Figure 24:
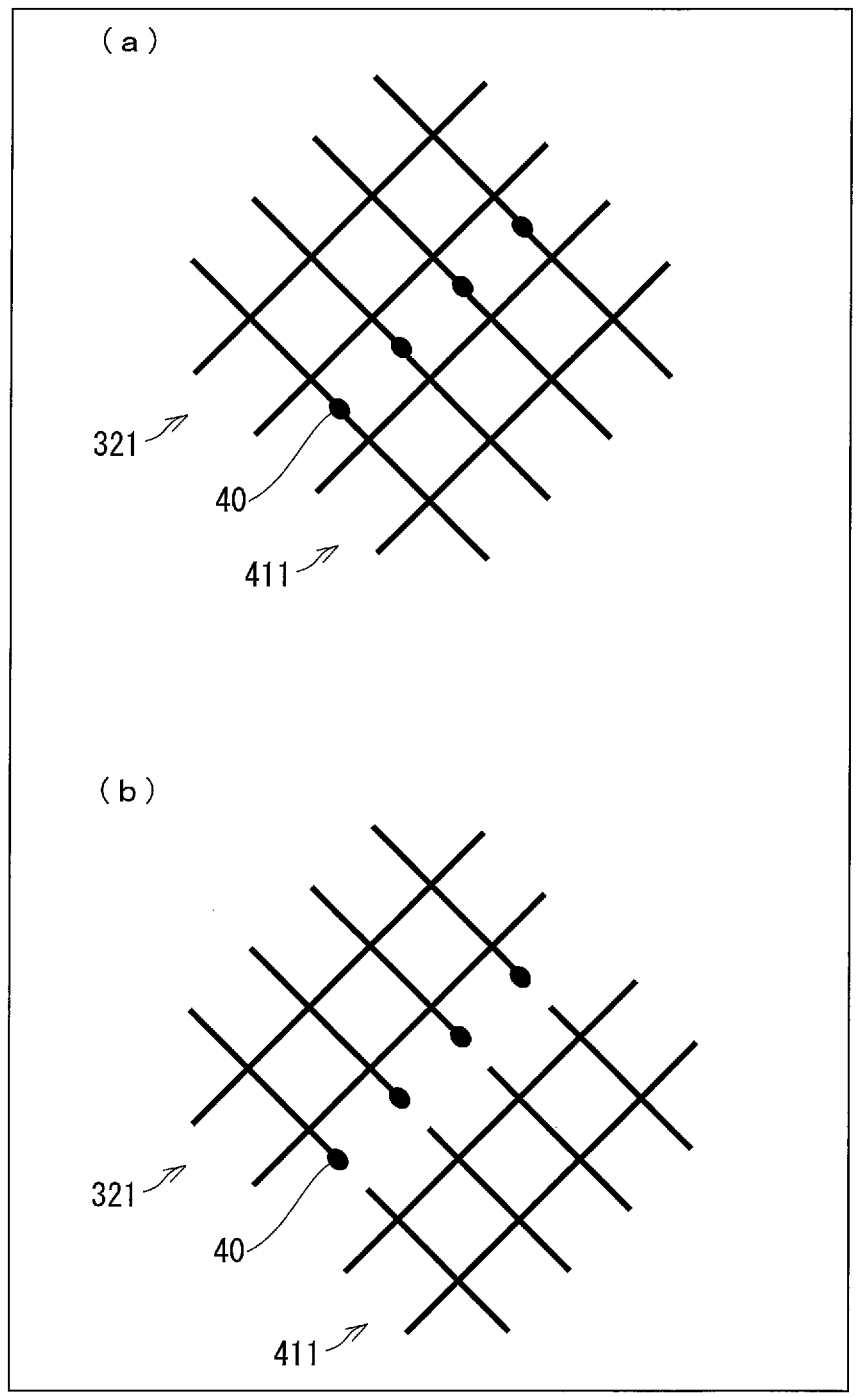
FIG. 24 is a view for explaining light transmittance of the touch panel substrate of Embodiment 5. (a) of FIG. 24 is a plan view illustrating part of the touch panel substrate in which the first electrode layer and a second electrode layer are properly aligned. (b) of FIG. 24 is a plan view illustrating part of the touch panel substrate in which the first electrode layer and the second electrode layer are not properly aligned.
Figure 25:
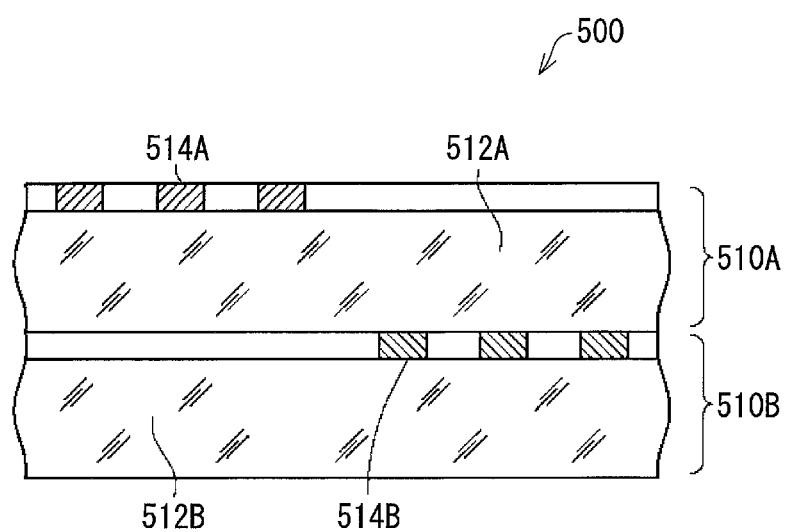
FIG. 25 is a cross-sectional view illustrating a layered conductive film of a touch panel of Patent Literature 1 serving as a conventional technique.
Figure 26:
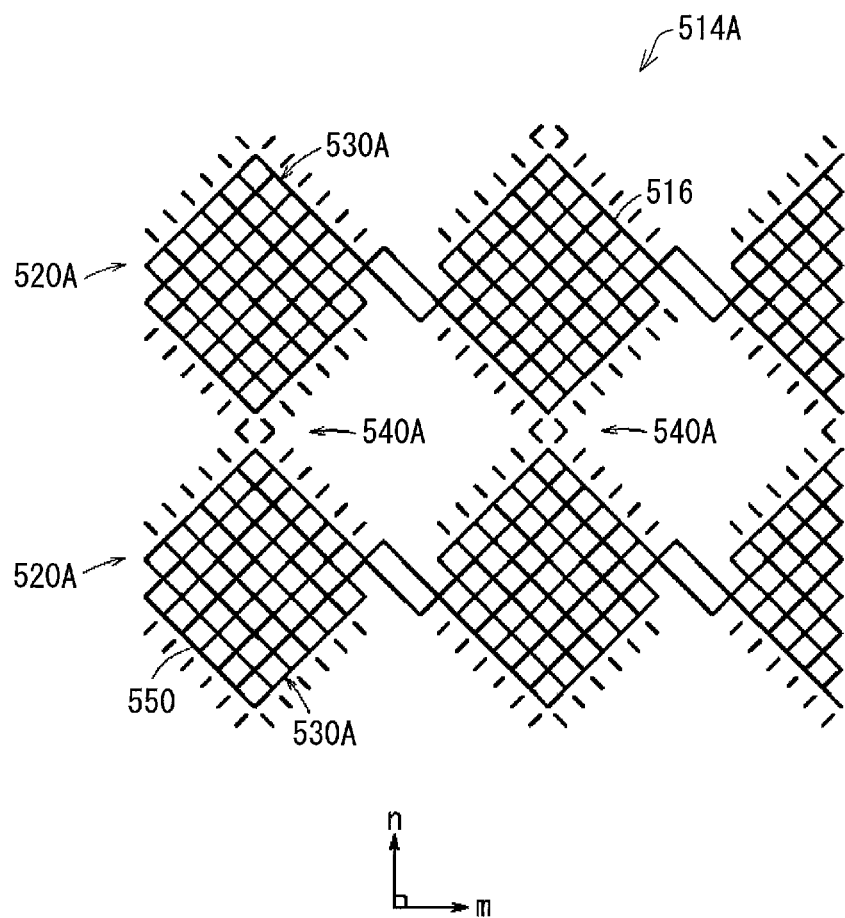
FIG. 26 is a plan view illustrating first conductive patterns formed in a first conductive film of the touch panel of Patent Literature 1 serving as a conventional technique.
Figure 27:
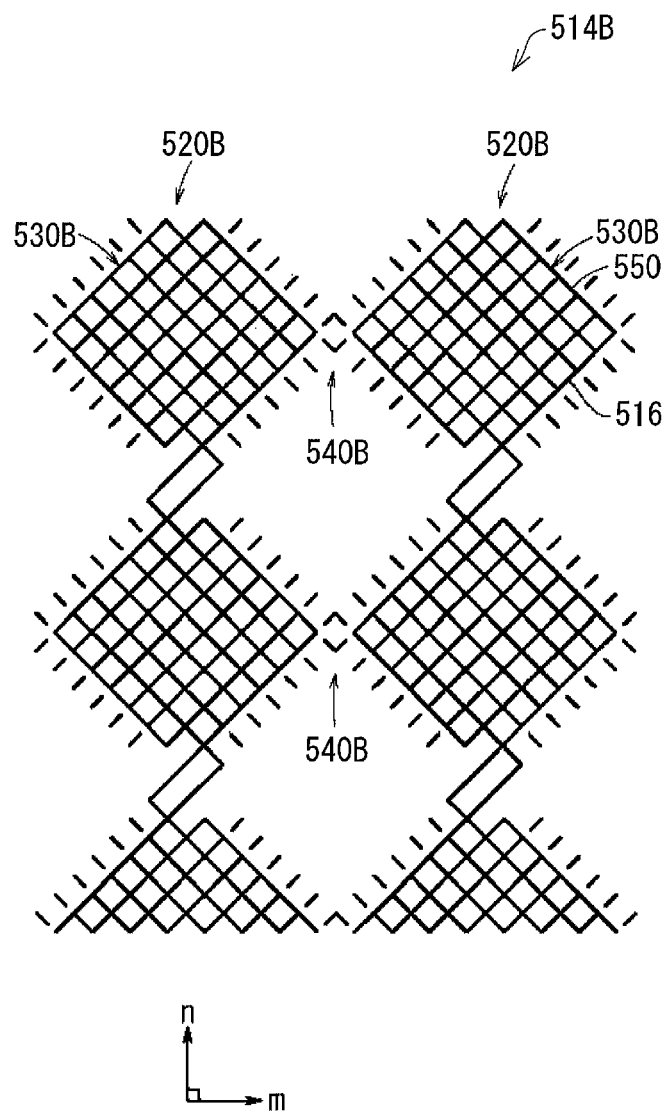
FIG. 27 is a plan view illustrating second conductive patterns formed in a second conductive film of the touch panel of Patent Literature 1 serving as a conventional technique.

The following description will discuss another embodiment of the present invention with reference to FIGS. 23 and 24. Note that, for convenience, identical reference numerals will be given to respective members having functions identical to those of the members described in the foregoing Embodiments, and descriptions of the members will be omitted.

A touch panel substrate 402 of Embodiment 5 includes a first electrode layer 410 and a second electrode layer. The second electrode layer is identical in configuration to the second electrode layer 320 of Embodiment 4 and, therefore, the description of the second electrode layer will be omitted.

<First Sensor Electrode>

FIG. 23 is a plan view illustrating, in detail, a configuration of the first electrode layer 410 of Embodiment 5.

Similar to the first electrode layer 310 of Embodiment 4, a shape of each outer edge of first sensor electrodes 411 included in the first electrode layer 410 is defined by ends of conductor lines 13 (see FIG. 23). However, the first electrode layer 410 of Embodiment 4 is different from the first electrode layer 310 of Embodiment 4 in that the ends of the conductor lines 13, which ends define the shape of the each outer edge of the first sensor electrodes 411, have no wide width part 40.

<Transmittance Uniformity>

(a) of FIG. 24 is a plan view illustrating part of the touch panel substrate 402 in which the first electrode layer 410 and the second electrode layer 420 are properly aligned. (b) of FIG. 24 is a plan view illustrating part of the touch panel substrate 402 in which the first electrode layer 410 and the second electrode layer 420 are not properly aligned.

As illustrated in (a) of FIG. 24, by an outer edge of a first sensor electrode 411 and an outer edge of a second sensor electrode 421 being arranged side by side when viewed from above, conductor lines uniformly arranged in a net-like pattern are formed by first conductor lines 13 and second conductor lines 14, when viewed from above. This causes the touch panel substrate 402 to have uniform in-plane light transmittance.

Meanwhile, even in a case where the first electrode layer 410 and the second electrode layer 420 are adhered to each other without being properly aligned as illustrated in (b) of FIG. 24, high light transmittance of a space and low light transmittance of an end of the second sensor electrode 421 are cancelled out in a boundary region.

This allows a variation in light transmittance to be reduced and small between (i) the boundary region and (ii) a vicinity of the center of the first sensor electrode 411 and a vicinity of the center of the second sensor electrode 421. That is, it is possible to suppress ununiformity of the light transmittance of an entire detection surface of the touch panel substrate 402.

Note that Embodiment 5 has described an example in which (i) the ends of the first conductor lines 13, which ends define the shape of each outer edge of the first sensor electrodes 411, have no wide width part 40 and (ii) ends of second conductor lines 14, which ends define a shape of each outer edge of the second sensor electrodes 421 have respective wide width parts 40. However, Embodiment 5 is not limited to such.

Alternatively, the ends of the first conductor lines 13, which ends define the shape of the each outer edge of the first sensor electrodes 411, can have respective wide width parts 40, and the ends of the second conductor lines 14, which ends define the shape of the each outer edge of the second sensor electrodes 421, can have no wide width part 40.

That is, it is only necessary that (i) a shape of part of the outer edge of any one of the first sensor electrode 411 and the second sensor electrode 421, which part is arranged side by side with the outer edge of the other of the first sensor electrode 411 and the second sensor electrode 421, be defined by ends of conductor lines included in the any one of the first sensor electrode 411 and the second sensor electrode 421 and (ii) the ends of the conductor lines have wide width parts.

SUMMARY

A touch panel substrate (2, 102, 202, 302, 402) in accordance with Aspect 1 of the present invention is a touch panel substrate including: a first electrode layer (10, 110, 210, 310, 410); an insulating layer (6); and a second electrode layer (20, 120, 220, 320, 420) provided so as to face the first electrode layer via the insulating layer, the first electrode layer including a plurality of first electrodes each of which is constituted by first conductor lines (13) arranged in a net-like pattern, the second electrode layer including a plurality of second electrodes each of which is constituted by second conductor lines (14) arranged in a net-like pattern, in part of an outer edge of each of the plurality of first electrodes which part is arranged side by side with an outer edge of at least one of the plurality of second electrodes when viewed from above, an end of at least one of the first conductor lines has a wide width part (40, 40a through 40e) which is wider than the other part of the at least one of the first conductor lines when viewed from above.

According to the above configuration, an end of at least one of conductor lines which end defines a shape of an outer edge of a first electrode has a wide width part. This causes an end of the first electrode to be lower in light transmittance than a vicinity of the center of the first electrode.

Meanwhile, in a case where the first electrode and a second electrode are provided so as to be apart from each other when viewed from above, a region between the first and second electrodes is a space where no conductor line is provided. The space is high in light transmittance.

Therefore, in a case where the space, the end of the first electrode, and an end of the second electrode which is adjacent to the first electrode when viewed from above are regarded as a boundary region, high light transmittance in the space and low light transmittance in the end of the first electrode are cancelled out in the boundary region.

This allows a variation in light transmittance to be reduced and small between (i) the boundary region and (ii) a vicinity of the center of each of the first and second electrodes. That is, even in a case where the first and second electrodes are provided so as to be apart from each other, it is possible to suppress ununiformity of the light transmittance of the electrode layers as a whole.

Therefore, according to an electronic device made up of the touch panel substrate, including the plurality of first and second electrodes, and a display device, in a case where a user of the electronic device looks at an image displayed by the display device, it is possible to cause a difference in brightness, between (i) a vicinity of the region between the first and second electrodes and (ii) the vicinity of the center of each of the first and second electrodes, to be at or below a limit above which a human can recognizes the difference.

This makes it possible to (i) cause a pattern corresponding to the region between the electrodes not to be easily recognized visually and (ii) suppress a deterioration of display quality of such a displayed image.

The touch panel substrate in accordance with Aspect 2 of the present invention can be arranged such that: in Aspect 1, the outer edge of the each of the plurality of first electrodes, each of which is constituted by the first conductor lines arranged in the net-like pattern, is formed in such a manner that the first conductor lines are divided into pieces; the outer edge of each of the plurality of second electrodes, each of which is constituted by the second conductor lines arranged in the net-like pattern, is formed in such a manner that the second conductor lines are divided into pieces; the first conductor lines of the outer edge of the each of the plurality of first electrodes are divided across portions of the first conductor lines at which portions the first conductor lines do not intersect each other when viewed from above; and the second conductor lines of the outer edge of the each of the plurality of second electrodes are divided across portions of the second conductor lines at which portions the second conductor lines do not intersect each other when viewed from above.

According to the above configuration, it is possible to form electrodes each having conductor lines, with a simple configuration and a simple method.

Furthermore, in a case where the conductor lines are divided across portions of the conductor lines at which portions the conductor lines do not intersect each other (that is, in a case where the conductor lines are divided across arms of the conductor lines), it is possible to reduce ununiformity of an aperture ratio (light transmittance) even when the first electrode layer and the second electrode layer are misaligned.

The touch panel substrate in accordance with Aspect 3 of the present invention can be arranged such that, in Aspect 1 or 2, an area of the wide width part is not more than $a \times (a-2d)/135$ when viewed from above, where, when viewed from above, "d" denotes a width of part, other than the wide width part, of the at least one of the first conductor lines, and "a" denotes an interval between adjacent ones of the first conductor lines which adjacent ones extend in parallel.

The above configuration makes it possible to suppress ununiformity of light transmittance which ununiformity is caused by the wide width part itself.

The touch panel substrate in accordance with Aspect 4 of the present invention can be arranged such that, in any one of Aspects 1 through 3, a width of the wide width part is not more than 50 µm when viewed from above.

The above configuration makes it possible to suppress ununiformity of light transmittance which ununiformity is caused by the wide width part itself.

The touch panel substrate in accordance with Aspect 5 of the present invention can be arranged such that, in any one of Aspects 1 through 4, a distance, between the wide width part and an intersection at which the first conductor lines intersect each other, is not less than 100 µm when viewed from above.

The above configuration makes it possible to suppress ununiformity of light transmittance which ununiformity is caused by the wide width part and the intersection of the conductor lines.

The touch panel substrate in accordance with Aspect 6 of the present invention can be arranged such that, in any one of Aspects 1 through 5, in part of the outer edge of each of the plurality of second electrodes which part is arranged side by side with the outer edge of at least one of the plurality of first electrodes when viewed from above, an end of at least one of the second conductor lines has a wide width part which is wider than the other part of the at least one of the second conductor lines when viewed from above; and the wide width part at the end of the at least one of the first conductor lines overlaps the wide width part at the end of the at least one of the second conductor lines, when viewed from above.

The above configuration makes it possible to suppress ununiformity of light transmittance which ununiformity is caused by the wide width part itself.

The touch panel substrate in accordance with Aspect 7 of the present invention can be arranged such that, in any one of Aspects 1 through 6, the outer edge of each of the plurality of second electrodes has such a shape that a rectangle has a plurality of recesses on one of sides of the rectangle.

The touch panel substrate in accordance with Aspect 8 of the present invention can be arranged such that, in any one of Aspects 1 through 6, the outer edge of the each of the plurality of first electrodes and the outer edge of each of the plurality of second electrodes each have such a shape that a plurality of quadrangles are connected to each other via a vertex of each of the plurality of quadrangles.

An electronic device (1) in accordance with Aspect 9 of the present invention can include: a touch panel substrate of any one of Aspects 1 through 8; and a display device (3).

The present invention is not limited to the description of the embodiments, but may be altered by a skilled person in the art within the scope of the claims. An embodiment derived from a proper combination of technical means disclosed in different embodiments is also encompassed in the technical scope of the present invention. Furthermore, by a combination of technical means disclosed in different embodiments, a new technical feature can be derived.

INDUSTRIAL APPLICABILITY

The present invention is preferably applicable to touch panel substrates including electrodes made up of conductor lines.

REFERENCE SIGNS LIST

1 Electronic device
2, 102, 202, 302, 402 Touch panel substrate
3 Display Device
6 Substrate 10, 110, 210, 310, 410 First electrode layer
20, 120, 220, 320, 420 Second electrode layer
13 First conductor lines (conductor line)
14 Second conductor line (conductor line)
40, 40a through 40e Wide width part
a Conductor line pitch
d Conductor line width
S Area of wide width part

The invention claimed is:

1. A touch panel substrate comprising:
a substrate;
a first electrode layer located on a first surface of the substrate;
an insulating layer; and
a second electrode layer provided so as to face the first electrode layer via the insulating layer, wherein
the first electrode layer includes a plurality of first electrodes each of which includes first opaque conductor lines arranged in a net-shaped pattern and directly physically connected to each other at an intersection of respective first opaque conductor lines on the first surface of the substrate,
the second electrode layer includes a plurality of second electrodes each of which includes second opaque conductor lines arranged in a net-shaped pattern,
the plurality of first electrodes and the plurality of second electrodes are spaced apart from each other when viewed from above,
in a portion of an outer edge of each of the plurality of first electrodes which is arranged side by side with an outer edge of at least one of the plurality of second electrodes when viewed from above, an end of at least one of the first opaque conductor lines extends along a straight line and has a wide width portion which is wider than another portion of the at least one of the first opaque conductor lines when viewed from above,
the wide width portion at the end of the at least one of the first opaque conductor lines is not located at the intersection where the first opaque conductor lines are directly physically connected to each other, and
the first opaque conductor lines of one of the plurality of first electrodes are aligned in parallel along a same straight line as the first opaque conductor lines of a directly adjacent one of the plurality of first electrodes.

2. The touch panel substrate as set forth in claim 1, wherein:
the outer edge of the each of the plurality of first electrodes, each of which includes the first opaque conductor lines arranged in the net-shaped pattern, is formed in such a manner that the first opaque conductor lines are divided into pieces;
the outer edge of each of the plurality of second electrodes, each of which includes the second opaque conductor lines arranged in the net-shaped pattern, is formed in such a manner that the second opaque conductor lines are divided into pieces;
the first opaque conductor lines of the outer edge of the each of the plurality of first electrodes are divided across portions of the first opaque conductor lines at which portions the first opaque conductor lines do not intersect each other when viewed from above; and
the second opaque conductor lines of the outer edge of the each of the plurality of second electrodes are divided across portions of the second opaque conductor lines at which portions the second opaque conductor lines do not intersect each other when viewed from above.

3. The touch panel substrate as set forth in claim 1, wherein
an area of the wide width part is not more than a×(a−2d)/135 when viewed from above,
where, when viewed from above, "d" denotes a width of part, other than the wide width part, of the at least one of the first opaque conductor lines, and
"a" denotes an interval between adjacent ones of the first opaque conductor lines which adjacent ones extend in parallel.

4. The touch panel substrate as set forth in claim 1, wherein a width of the wide width portion is not more than 50 µm when viewed from above.

5. The touch panel substrate as set forth in claim 1, wherein a distance, between the wide width portion and the intersection at which the first opaque conductor lines intersect each other, is not less than 100 µm when viewed from above.

6. The touch panel substrate as set forth in claim 1, wherein:
in a portion of the outer edge of each of the plurality of second electrodes which is arranged side by side with the outer edge of at least one of the plurality of first electrodes when viewed from above, an end of at least one of the second opaque conductor lines has a wide width portion which is wider than another portion of the at least one of the second opaque conductor lines when viewed from above; and
the wide width portion at the end of the at least one of the first opaque conductor lines overlaps the wide width portion at the end of the at least one of the second opaque conductor lines, when viewed from above.

7. The touch panel substrate as set forth in claim 1, wherein the outer edge of each of the plurality of second electrodes has such a shape that a rectangle has a plurality of recesses on one of sides of the rectangle.

8. The touch panel substrate as set forth in claim 1, wherein the outer edge of the each of the plurality of first electrodes and the outer edge of each of the plurality of second electrodes each have such a shape that a plurality of quadrangles are connected to each other via a vertex of each of the plurality of quadrangles.

9. An electronic device comprising:
a touch panel substrate recited in claim 1; and
a display device.

* * * * *